(12) United States Patent
Kadowaki

(10) Patent No.: US 6,313,921 B1
(45) Date of Patent: Nov. 6, 2001

(54) IMAGE FORMING SYSTEM, IMAGE FORMING APPARATUS AND METHOD OF CONTROLLING THE SAME

(75) Inventor: Toshihiro Kadowaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/157,137

(22) Filed: Sep. 18, 1998

(30) Foreign Application Priority Data

Sep. 24, 1997 (JP) .................................................... 9-258983

(51) Int. Cl.$^7$ ....................................................... G06H 15/00
(52) U.S. Cl. ............................................... 358/1.15; 358/1.1
(58) Field of Search ...................................... 358/1.1, 1.15, 358/1.2, 1.16, 1.18, 1.13, 1.6, 402, 403, 405, 452; 705/60–62, 50–51

(56) References Cited

U.S. PATENT DOCUMENTS

| | | | |
|---|---|---|---|
| 4,843,571 | * 6/1989 | Nutermans et al. | 358/1.1 |
| 4,918,542 | 4/1990 | Nagashima et al. | 358/451 |
| 5,021,876 | 6/1991 | Kurita et al. | 358/75 |
| 5,166,786 | 11/1992 | Sakai et al. | 358/76 |
| 6,151,590 | * 11/2000 | Cordery et al. | 705/60 |

* cited by examiner

*Primary Examiner*—Arthur G. Evans
(74) *Attorney, Agent, or Firm*—Fitzpatrick, Cella, Harper & Scinto

(57) ABSTRACT

A print job containing designation of personalization for setup data for image formation is received from, e.g., a computer. Personalizing information is acquired from a server via a network. On the basis of the acquired personalizing information, an image forming unit forms the image based on the print job.

57 Claims, 18 Drawing Sheets

ARRANGEMENT OF PDL ─┬─ CHARACTER CODE IMAGE DESCRIPTION
                    ├─ GRAPHIC CODE IMAGE DESCRIPTION
                    └─ RASTER IMAGE DATA IMAGE DESCRIPTION char_color = ( 0.0, 0.0, 0.0 ) ;   ← L100 string1 = "IC" ;   ← L101 put_char ( 0.0, 0.0, 0.3, 0.1, string1 ) ;   ← L102 line_color = ( 1.0, 0.0, 0.0 ) ;   ← L103 put_line ( 0.9, 0.0, 0.9, 1.0, 0.1 ) ;   ← L104 image1 = { RGB, 8, 5, 5, R0, G0, B0,   ← L105
                        R1, G1, B1,
                           ⋮
                        R24, G24, B24 } ;

put_image ( 0.0, 0.5, 0.5, 0.5, image1 ) ;   ← L106

| | |
|---|---|
| color = RGB8; | ← L107 |
| color = K8; | ← L108 |
| paper = A3Paper; | ← L109 |
| paper = A4Trans.; | ← L110 |
| duplex = on | ← L111 |
| copy = 4; | ← L112 |
| print; | ← L113 |
| error_report = 2; | ← L114 |
| complete_report = 0; | ← L115 |
| manual_feed_timeout = 0; | ← L116 |
| user= kadowaki; | ← L117 |
| userID= 012345; | ← L118 |
| personalize = on; | ← L119 |

FIG. 9A

!! Completed !!

Date : 1996. 12. 26
User : Kadowaki
Pages : 20
Copies : 1
Costs : 200

!! Error !!

Date : 1996. 12. 26
Job : text1
User : Kadowaki
Pages : 3
Copies : 1
Costs : 30
Error : Not stapled
Reason : Too many pages

!! Error !!

Date : 1996. 12. 26
User : Kadowaki
Error : Not printed
Reason : manual feed timeout

| | |
|---|---|
| 31-1 | COMMON UPPER-LIMIT NUMBER OF PRINTED SHEETS |
| 31-2 | COMMON AVAILABLE FUNCTION LIST |
| 31-3 | COMMON NORMAL TERMINATION PROCESS |
| 31-4 | COMMON ABNORMAL TERMINATION PROCESS |
| 31-5 | COMMON USER SWITCH DATA |
| 31-6 | COMMON USER NAME |
| 31-7 | OTHER REGISTERED DATA HOLDING AREA |

FIG. 10B

| | |
|---|---|
| 32-1 | UPPER-LIMIT NUMBER OF PRINTED SHEETS |
| 32-2 | AVAILABLE FUNCTION LIST |
| 32-3 | NORMAL TERMINATION PROCESS |
| 32-4 | ABNORMAL TERMINATION PROCESS |
| 32-5 | USER SWITCH DATA |
| 32-6 | USER NAME |
| 32-7 | WORK AREA |

FIG. 10C

| | |
|---|---|
| 33-1 | COLOR : AVAILABLE |
| 33-2 | BLACK AND WHITE : UNAVAILABLE |
| 33-3 | TRANSPARENCY : AVAILABLE |
| 33-4 | SINGLE SIDED : AVAILABLE |
| 33-5 | OTHERS |

FIG. 10D

| | |
|---|---|
| 33-6 | DISPLAY LANGUAGE : ENGLISH |
| 33-7 | MANUAL FEED TIMEOUT VALUE : 0 |
| 33-8 | COVER PAGE : YES |
| 33-9 | OTHERS |

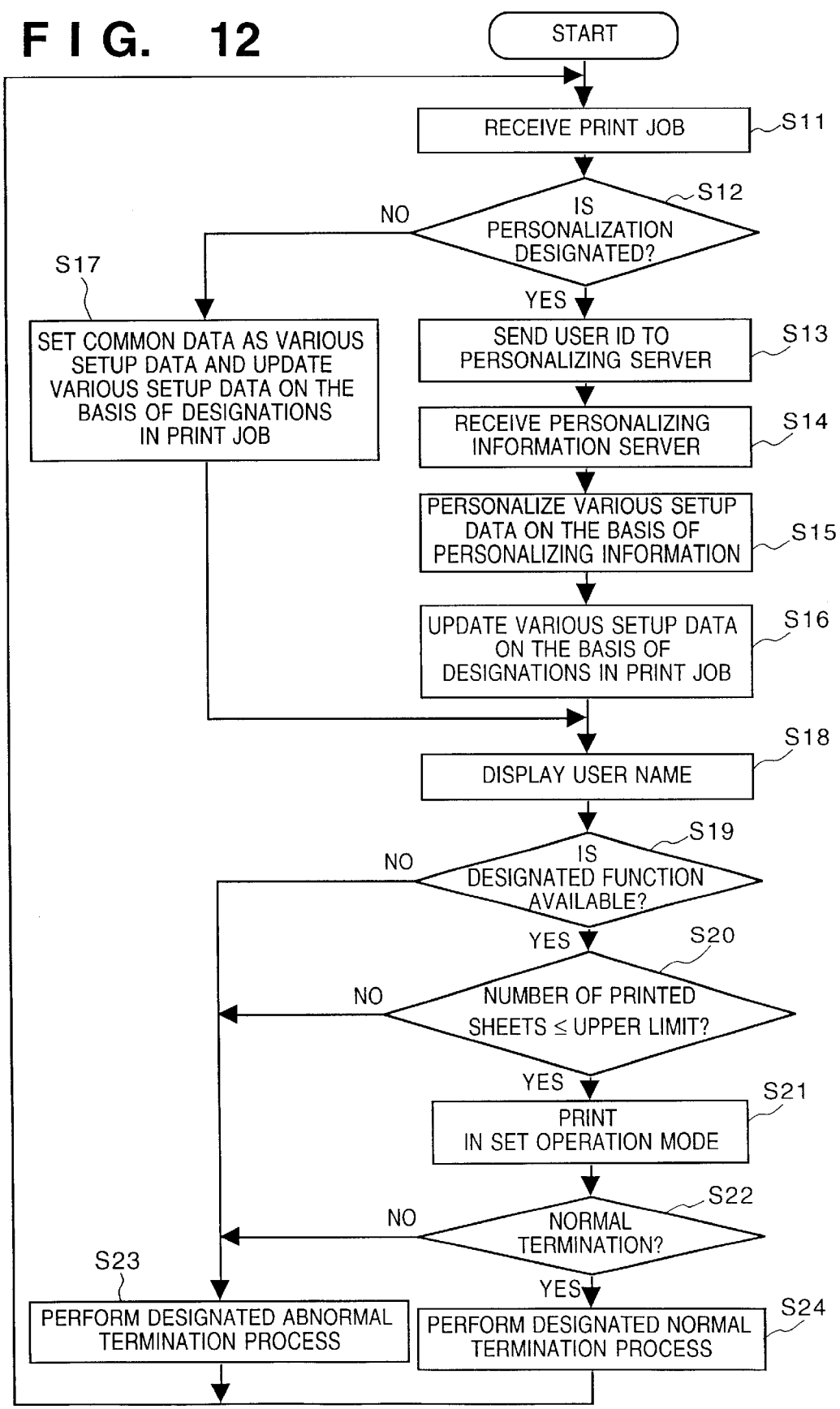

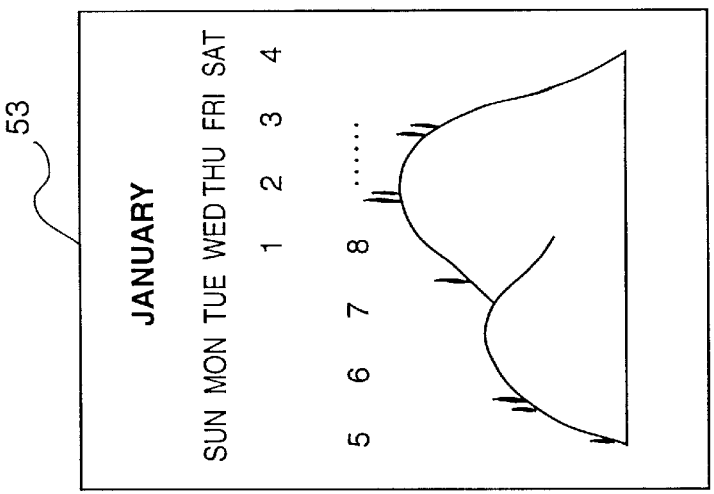
FIG. 14C
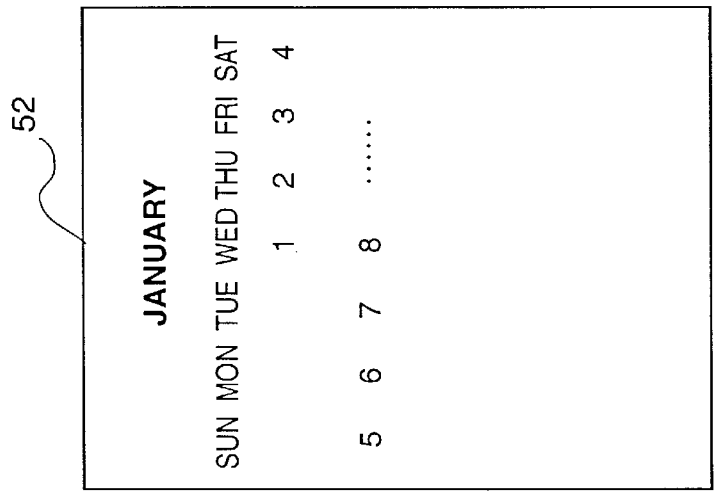
FIG. 14B
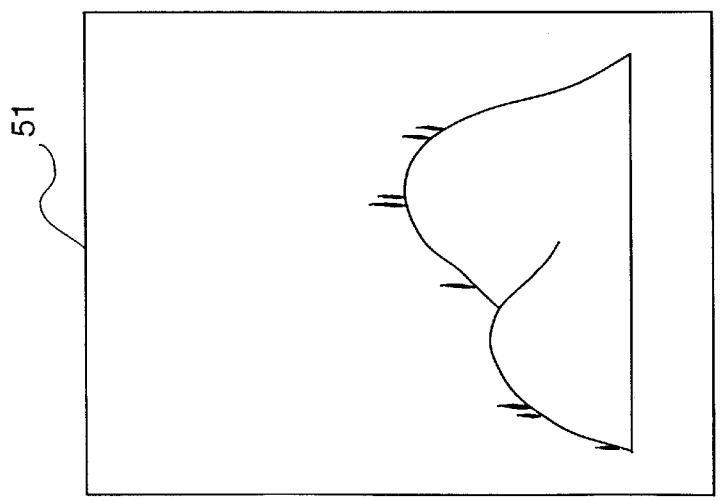
FIG. 14A

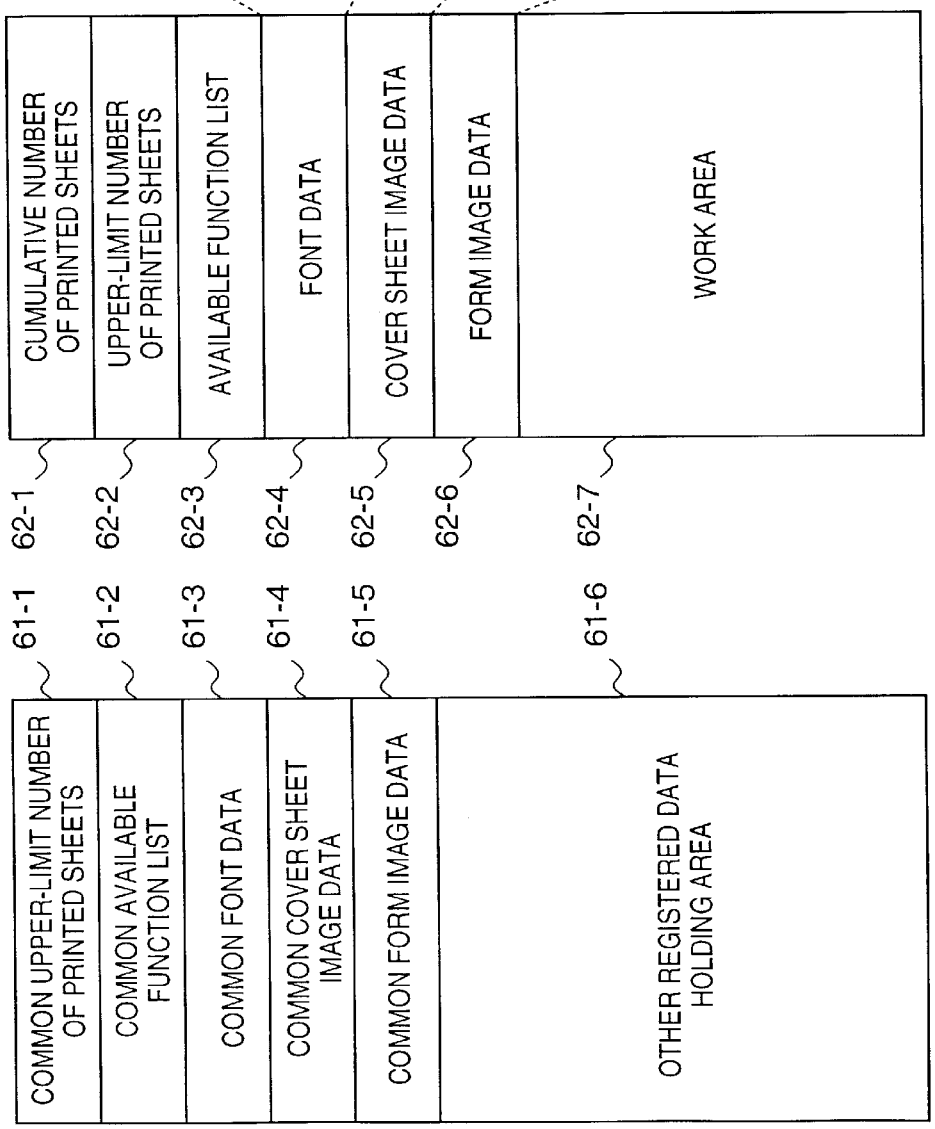

FIG. 19

PERSONALIZING KEY :
NETWORK ADDRESS +
FILE NAME
PERSONALIZATION : ON     —91

FACSIMILE DATA     —92

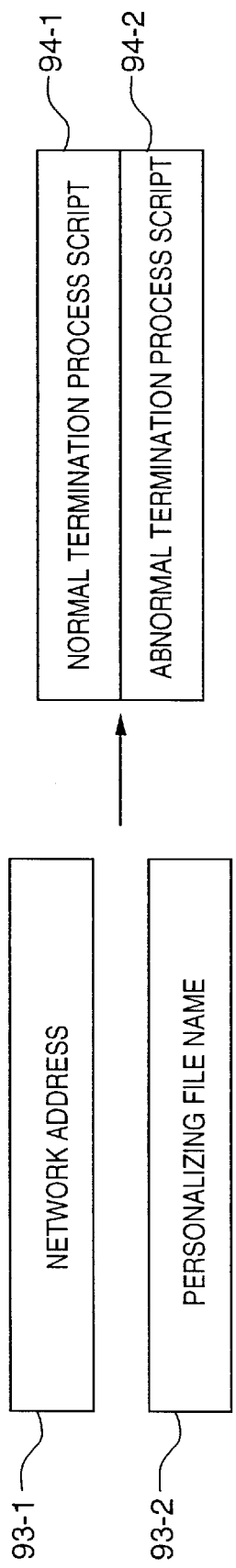

FIG. 21A

| | |
|---|---|
| #START | L201 |
| #MAILTO : kadowaki@xxx.kanon.co.jp | L202 |
| #END | L203 |

FIG. 21B

| | |
|---|---|
| #START | L211 |
| #FAXTO : 03-999-9999 | L212 |
| #END | L213 |

FIG. 21C

| | |
|---|---|
| #START | L221 |
| #IF : FATALERROR | L222 |
| #MAILTO : admini@xxx.kanon.co.jp | L223 |
| #FAXTO : 03-999-9999 | L224 |
| #ELSE :WAIT | L225 |
| #ENDIF | L226 |
| #END | L227 |

IMAGE FORMING SYSTEM, IMAGE FORMING APPARATUS AND METHOD OF CONTROLLING THE SAME

BACKGROUND OF THE INVENTION

FIELD OF THE INVENTION

The present invention relates to an image forming system in which a server, an external apparatus, and an image forming apparatus are connected via a network, an image forming apparatus, and a method of controlling the same.

In a conventional image forming apparatus such as a printer, various setup data for printing are described in a print job or previously set in the printer by using an operation unit or the like of the printer. Examples of the various setup data are as follows.

1) Print Modes

Color printing or black-and-white printing, double-sided printing or single-sided printing, a paper feed stage including manual feed or a paper size, and the number of copies are designated. These data are usually designated in a print job. If no data is designated, default data held by the printer is used.

2) Supplementary Image Data

Supplementary image data are default font data, form overlay image data, and the like. As these supplementary image data, default data originally held by the printer or data previously set in the printer by using utilities or the like is commonly used. In a print job, designation of only font data or form overlay image data to be used is described.

3) Other Setup Data

Other setup data include designation of printing of a cover page, designation of control if there is no optimum sheet, and paper feed timeout during manual paper feed. These data are usually set in the printer by using an operation unit or the like of the printer.

The above image forming apparatus has the following problems.

First, the following problems arise when various setup data are described in a print job.

1) If the number of setup items increases or the setup contents contain supplementary image data, the size of print job increases. Accordingly, the time during which a computer, on the transmitting side, is kept busy prolongs during print job transmission. Additionally, the printer must have similar various setup data for each print job. Also, when a plurality of print jobs are to be spooled by a spooler, a large spooling area is necessary if the size of each print job increases.

2) When an old print job is again printed, old data in the print job are used. For example, if a position name is contained as a part of a user name, an old position name in an old print job is printed on a cover page or the like. This sometimes makes it difficult to identify the user of the print job.

3) Each computer on the transmitting side must have utilities for various setup data. Also, a computer which uses a plurality of different types of image forming apparatuses must have utilities for various setup data for each individual type.

4) To hold previous setup data, each computer on the transmitting side must have various setup data. Also, a computer which uses a plurality of different types of image forming apparatuses must have various setup data for each individual type.

5) Setup data which can be changed only by a manager cannot be designated in a print job by each user.

Second, the following problems arise when various data are previously set in the printer by using the operation unit or the like of the printer.

6) Since various setup data are common to all users, the taste of each user cannot be reflected. Also, management data which can be changed only by a manager cannot be set in accordance with the taste of each individual user.

7) When a single user uses a plurality of printers, the same data must be set to these printers. If the setup data is different, the printers behave differently. Consequently, results are sometimes different from the intention of the user.

8) When a plurality of printers are used, each printer must hold setup data. For example, if a specific user uses a certain font, the font data must be installed in all printers to be used.

9) To keep various setup data even after the power supply of each apparatus is turned off, the data must be stored in each apparatus by using a relatively expensive nonvolatile storage means. To reduce cost, it is difficult to set a large amount of data and store complicated image data and the like.

10) Various setup data must be reset when an apparatus is replaced.

SUMMARY OF THE INVENTION

The present invention has been made in consideration of the above problems and has as its object to provide an image forming system in which a server, an external apparatus, and an image forming apparatus are connected via a network and which can significantly improve the operability, an image forming apparatus, and a method of controlling the same.

To achieve the above object, an image forming system according to the present invention has the following arrangement.

That is, an image forming system in which a server, an external apparatus, and an image forming apparatus are connected via a network, comprises generating means, provided in the external apparatus, for generating image forming information containing a key for designating acquisition of setup information for image formation, transmitting means for transmitting the image forming information generated by the generating means to the image forming apparatus, managing means, provided in the server, for managing setup information for image formation by the image forming apparatus, receiving means, provided in the image forming apparatus, for receiving the image forming information, acquiring means for acquiring setup information managed in the server and corresponding to the key contained in the image forming information received by the receiving means, and forming means for forming an image corresponding to the image forming information on the basis of the setup information acquired by the acquiring means.

Preferably, the image forming apparatus is at least a printer or a facsimile apparatus.

To achieve the above object, an image forming system according to the present invention has the following arrangement.

That is, an image forming apparatus connected to a server and an external apparatus via a network, comprises receiving means for receiving, from the external apparatus, image forming information containing a key for designating acquisition of setup information for image formation, acquiring means for acquiring, from the server, setup information corresponding to the key contained in the image forming information received by the receiving means, and forming means for forming an image corresponding to the image forming information on the basis of the setup information acquired by the acquiring means.

Preferably, the key is a user ID for identifying the image forming information, and the acquiring means transmits the user ID to the server and acquires setup information corresponding to the user ID.

Also, the user ID preferably indicates a user who has produced the image forming information.

The user ID preferably indicates an external apparatus which has produced the image forming information.

The user ID preferably contains password.

Preferably, the key contains access information for accessing a server, and the acquiring means accesses the server indicated by the access information and acquires setup information corresponding to the access information.

In addition, the access information is preferably a network address of the server.

The access information preferably contains a name of a file containing setup information in addition to the network address of the server.

The acquiring means preferably updates a current value of the setup information.

The acquiring means preferably updates a default value of the setup information.

Preferably, the server comprises font holding means for holding font data, and the setup information contains setup data for the font data.

The server preferably comprises supplementary image holding means for holding a supplementary image formable by the forming means, and the setup information contains setup data for the supplementary image.

The setup information preferably contains setup data for a process when the image formation based on the image forming information terminates normally.

The setup information preferably contains setup data for a process when an error occurs.

Preferably, the image forming apparatus further comprises display means for displaying information relating to the image formation based on the image forming information, and the setup information contains setup data for contents displayed by the display means.

The setup information preferably contains setup data for restrictions in the image formation based on the image forming information.

Moreover, the restrictions preferably contain setup data for available functions.

The restrictions preferably contain setup data for available amounts.

The setup information preferably contains types and contents of various setup data in the form of a list.

The setup information is preferably formed by a script.

The setup information is preferably formed by a program.

Preferably, the key contains machine type group ID information indicating a machine type group of the external apparatus, and the acquiring means acquires setup information corresponding to the machine type group ID information from the server.

Preferably, the key contains machine type ID information indicating a machine type of the external apparatus, and the acquiring means acquires setup information corresponding to the machine type ID information from the server.

Preferably, the key contains apparatus ID information for identifying each of a plurality of external apparatuses, and the acquiring means acquires setup information corresponding to the apparatus ID information from the server.

The acquiring means preferably acquires setup information from one of a plurality of servers on the basis of the key.

Preferably, the setup information contains a plurality of elements, and the acquiring means acquires a part of the setup information where necessary.

The receiving means preferably receives the image forming information from an external apparatus connected in a one-to-one correspondence with the receiving means through a public network on the basis of a communication function defined by CCITT recommendation.

Furthermore, the key preferably contains an instruction to update setup information managed by the server.

To achieve the above object, a method of controlling an image forming apparatus according to the present invention has the following arrangement.

That is, a method of controlling an image forming apparatus connected to a server and an external apparatus via a network, comprises the reception step of receiving, from the external apparatus, image forming information containing a key for designating acquisition of setup information for image formation, the acquisition step of acquiring, from the server, setup information corresponding to the key contained in the image forming information received in the reception step, and the formation step of forming an image corresponding to the image forming information on the basis of the setup information acquired in the acquisition step.

To achieve the above object, a computer readable memory according to the present invention has the following arrangement.

That is, a computer readable memory storing program codes for controlling an image forming apparatus connected to a server and an external apparatus via a network, comprises a program code of the reception step of receiving, from the external apparatus, image forming information containing a key for designating acquisition of setup information for image formation, a program code of the acquisition step of acquiring, from the server, setup information corresponding to the key contained in the image forming information received in the reception step, and a program code of the formation step of forming an image corresponding to the image forming information on the basis of the setup information acquired in the acquisition step.

To achieve the above object, an image forming system according to the present invention has the following arrangement.

That is, an image forming system in which a server and an image forming apparatus are connected via a network, comprises generating means, provided in the image forming apparatus, for generating image forming information containing a key for designating acquisition of setup information for image formation, transmitting means for transmitting the image forming information generated by the generating means to the server, managing means, provided in the server, for managing setup information for image formation by the image forming apparatus, receiving means for receiving the image forming information transmitted from the image forming apparatus, acquiring means for acquiring setup information managed by the managing means and corresponding to the key contained in the image forming information received by the receiving means, and forming means for forming an image corresponding to the image forming information on the basis of the setup information acquired by the acquiring means.

To achieve the above object, an image forming apparatus according to the present invention has the following arrangement.

That is, an image forming apparatus connected to a server via a network, comprises generating means for generating image forming information containing a key for designating acquisition of setup information for image formation, acquiring means for acquiring, from the server, setup information corresponding to the key contained in the image forming information generated by the generating means, and forming means for forming an image corresponding to the image forming information on the basis of the setup information acquired by the acquiring means.

To achieve the above object, a method of controlling an image forming apparatus according to the present invention has the following arrangement.

That is, a method of controlling an image forming apparatus connected to a server via a network, comprises the generation step of generating image forming information containing a key for designating acquisition of setup information for image formation, the acquisition step of acquiring, from the server, setup information corresponding to the key contained in the image forming information generated in the generation step, and the formation step of forming an image corresponding to the image forming information on the basis of the setup information acquired in the acquisition step.

To achieve the above object, a computer readable memory according to the present invention has the following arrangement.

That is, a computer readable memory storing program codes for controlling an image forming apparatus connected to a server via a network, comprises a program code of the generation step of generating image forming information containing a key for designating acquisition of setup information for image formation;

a program code of the acquisition step of acquiring, from the server, setup information corresponding to the key contained in the image forming information generated in the generation step; and a program code of the formation step of forming an image corresponding to the image forming information on the basis of the setup information acquired in the acquisition step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 9A to 9C explain reports printed out or sent by mail when a print job terminates normally or abnormally in the first embodiment of the present invention;

FIGS. 10A to 10D explain various setup data according to the first embodiment of the present invention;

FIG. 12 is a flow chart showing a process executed by the printer according to the first embodiment of the present invention;

FIGS. 14A to 14C explain a form overlay function according to the second embodiment of the present invention;

FIGS. 15A to 15D explain various setup data according to the second embodiment of the present invention;

FIG. 19 explains a method of acquiring a FAX print job and a personalizing key according to the third embodiment of the present invention;

FIGS. 20A and 20B explain exchange of personalizing information according to the third embodiment of the present invention;

FIGS. 21A to 21C explain a process script when printing terminates normally and a process script when an error occurs in the third embodiment of the present invention.

DETAILED DESCRIPTION OF THE PREFERRED EMBODIMENTS

First Embodiment

Figure 1:
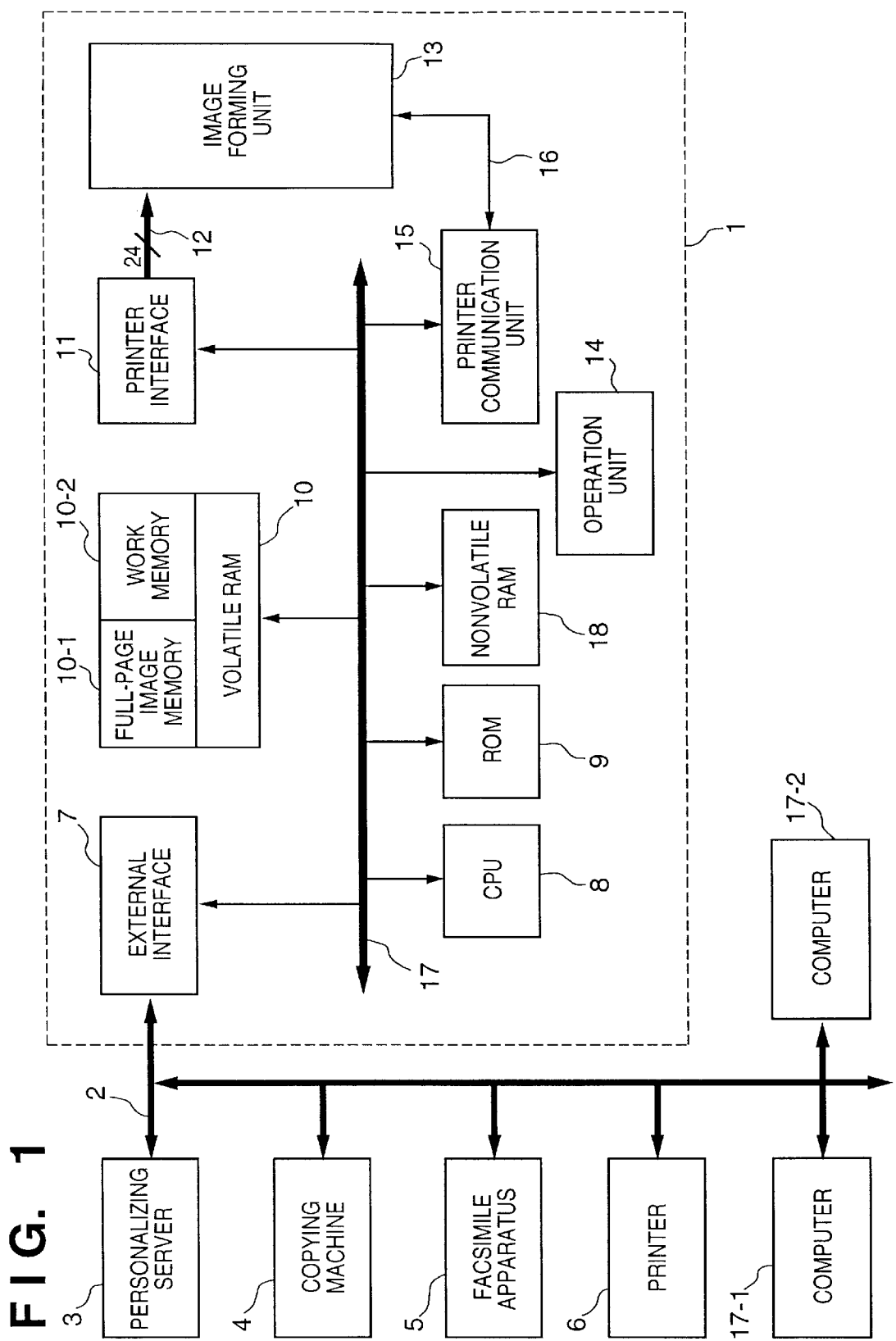
FIG. 1 is a block diagram showing the arrangement of an image forming system according to the first embodiment of the present invention.

FIG. 1 is a block diagram showing the arrangement of an image forming system according to the first embodiment of the present invention.

Referring to FIG. 1, a printer 1 and a personalizing server 3 are connected through a network 2 and exchange personalizing information (to be described later) through this network 2. In addition to the printer 1 and the personalizing server 3, a copying machine 4, a facsimile apparatus 5, and another printer 6 can be connected to the network 2. These apparatuses can also exchange personalizing information with the personalizing server 3 through the network 2. Computers 17-1 and 17-2 are also connected to the network 2 as external apparatuses for generating and sending print jobs to the printer 1.

The internal arrangement of the printer 1 will be described below.

When the computer 17-1 or 17-2 sends a print job through the network 2 and an external interface 7, a CPU 8 temporarily stores the print job in an internal work memory 10-2 of a volatile RAM 10. Assume that the print job used in the first embodiment is PDL data described in page description language (to be referred to as PDL hereinafter). The PDL data read out from the work memory 10-2 is mapped or rasterized into raster image data and written in an internal full-page image memory 10-1 of the volatile RAM 10. The mapped image data is read out from the full-page image memory 10-1 and sent to an image forming unit 13 via a printer interface 11 to form an image.

A ROM 9 is a read only memory which is not rewritable and does not lose its contents even when the power supply is turned off. The ROM 9 is used to hold programs and fixed data, and the CPU 8 executes processes on the basis of these programs. The volatile RAM 10 is an inexpensive rewritable memory which loses its contents when the power supply is turned off. The volatile RAM 10 is used to hold temporary data. In the first embodiment, the volatile RAM 10 is used as the image memory 10-1 and the work memory 10-2 as a temporary work area.

A nonvolatile RAM 18 is a relatively expensive rewritable memory which does not lose its contents even when the power supply is turned off. The nonvolatile RAM 18 is used to hold data to be stored for relatively long time periods. A printer communication unit 15 communicates with the image forming unit 13. An operation unit 14 is used by an operator to setup data relating to the printer 1 in front of the apparatus and displays messages for informing the operator of the apparatus status. A CPU bus 17 connects the individual components described above.

In the full-page image memory 10-1 of the first embodiment, one pixel is formed by 8 bits for each of R, G, and B (Red, Green, and Blue), i.e., a total of 24 bits. The full-page image memory 10-1 has a storage capacity capable of storing image data of one A3-size page. When A4-size image data is to be printed, data of two pages can be stored.

The image forming unit 13 of the first embodiment is a full-color electrophotographic copying machine which forms an image on the basis of raster image data 12 which is supplied via the printer interface 11 and in which one pixel is formed by 8 bits for each of R, G, and B. i.e., a total of 24 bits. Since this image formation is performed by using toners of four colors Y, M, C, and K (Yellow, Magenta, Cyan, and black), the image forming unit 13 converts R, G, and B into Y, M, C, and K. Although explanation will be omitted, the image forming unit 13 has a plurality of functions, e.g., color printing/black-and-white printing, single-sided printing/double-sided printing, printing of different sheet sizes, and plain paper printing/transparent paper printing.

Conventionally, various data for receiving a print job, mapping into raster image data, and forming an image are previously set in the printer 1 by using the operation unit 14 and the like or designated in each print job sent from, e.g., the computer 17-1. In addition to these means, the present invention uses a means by which the printer 1 acquire various data from the personalizing server 3 connected to the network. On the basis of these various setup data, the CPU 8 controls reception of a print job, mapping into raster image data, and image formation.

Various data set by using the operation unit 14 and the like are held in the nonvolatile RAM 18 so that the data are not lost even when the power supply of the printer 1 is turned off. On the other hand, various data designated in each print job sent from the computer or acquired acquired from the personalizing server 3 need not be held when the power supply of the printer 1 is turned off. Therefore, these data are held in the work memory 10-2 as a volatile RAM. Currently, small-capacity nonvolatile RAMs are more expensive than volatile RAMs of the same size, so increasing the size of the nonvolatile RAM 18 is not preferred in terms of cost. Accordingly, large amount of data cannot be set by the conventional method using the operation unit 14 and the like. In contrast, various data acquired from the personalizing server 3 are held in a relatively inexpensive volatile RAM, so large amount of data can also be set.

PDL data will be described below with reference to FIGS. 2 to 7.

FIGS. 2 to 7 explain PDL data according to the first embodiment of the present invention.

Figures 2, 3, 4, 5:
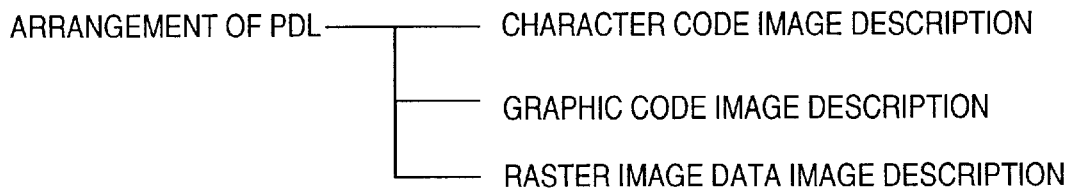
FIG. 2 explains PDL data according to the first embodiment of the present invention.
FIG. 3 explains the PDL data according to the first embodiment of the present invention.
FIG. 4 explains the PDL data according to the first embodiment of the present invention.
FIG. 5 explains the PDL data according to the first embodiment of the present invention.

As shown in FIG. 2, PDL (Page Description Language) represented by PostScript (registered trademark) of ADOBE Corp. is a language for describing an image of one page by combining elements such as (i) character code image description, (ii) graphic code image description, and (iii) raster image data image description. Data described by using these elements is PDL data.

FIG. 3 shows an example of the character code image description. L100 indicates designation of the color of character. The numbers in the parentheses represent the luminances of red, green, and blue in this order. The minimum and maximum values of the luminance are 0.0 and 1.0, respectively. In this example, black is designated as the character color. L101 indicates that a character string "IC" is substituted into a parameter string1. L102 indicates the layout of characters. The first and second parameters in the parentheses represent the X and Y coordinates, respectively, of a recording start position on a recording medium on which the character string is to be layed out. The third, fourth, and fifth parameters in the parentheses represent the character size, character pitch, and character string to be laid out, respectively. In this example, the character string "IC" substituted into the parameter string is laid out with a character size of 0.3 and a character pitch of 0.1 from the coordinate point (0.0,0.0).

FIG. 4 shows an example of the graphic code image description. Similar to L100, L103 indicates designation of the color of line, and the designated color is red in this example. L104 indicates that a line is to be drawn. The first and second parameters in the parentheses represent the X and Y coordinates, respectively, of the start point of the line. The third and fourth parameters in the parentheses represent the X and Y coordinates, respectively, of the end point of the line. The fifth parameter in the parentheses represents the line thickness. In this example, a line with a thickness of 0.1 is drawn from the start point coordinate point (0.9,0.0) the end point coordinate point (0.9,1.0).

FIG. 5 shows an example of the raster image data image description. L105 indicates that raster image data is substituted into a parameter image1. The first parameter in the brackets represents the image type and the number of color components of the raster image data. The second parameter in the brackets represents the number of bits per color component. The third and fourth parameters in the brackets represent the image sizes in the X and Y directions, respectively, of the raster image data. The fifth and subsequent parameters in the brackets represent the raster image data. The number of raster image data is the product of the number of color components forming one pixel and the image sizes in the X and Y directions. In this example, the raster image data is an R, G, and B image and formed by three color components (red, green, and blue). Therefore, the number of raster image data is 3×5×5=75. L106 indicates the layout of the raster image data. The first and second parameters in the parentheses represent the X and Y coordinates, respectively, of a recording start point on a recording medium on which the raster image data are arranged. The third and fourth parameters in the parentheses represent the image sizes in the X and Y directions, respectively, of the raster image data. The fifth parameter in the parentheses represents the raster image data to be laid out. In this example, the raster image data substituted into the parameter imagel are laid out with dimensions (0.5,0.5) from the coordinate point (0.0,0.5).

Figures 6, 7:
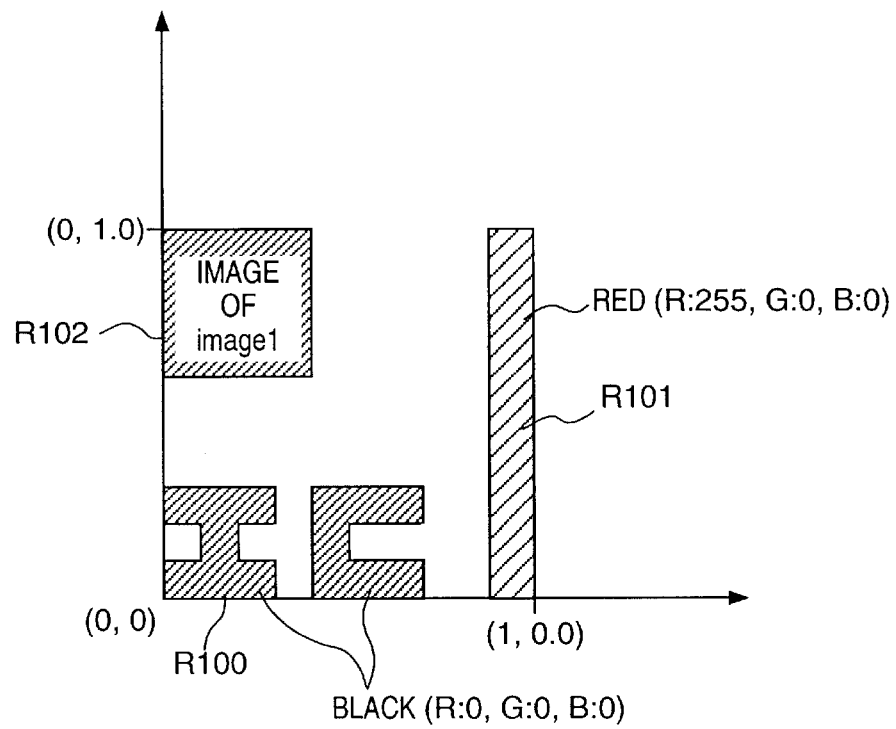
FIG. 6 is a graph for explaining the PDL data according to the first embodiment of the present invention.
FIG. 7 explains the PDL data according to the first embodiment of the present invention.

FIG. 6 shows raster image data mapped by interpreting the image descriptions shown in FIGS. 3 to 5 in one page. R100, R101, and R102 denote raster image data mapped from the PDL data shown in FIGS. 3 to 5. In effect, these raster image data are mapped in units of R, G, and B color components in the full-page image memory 10-1. Hence, in the portion of R100, only 0's are written in memory areas corresponding to the R, G, and B color components. In the portion of R101, 255, 0, and 0 are written.

As described above, the PDL data transmitted from the computer 17-1 or 17-2 are mapped into raster image data and written in the full-page image memory 10-1.

In the PDL data used in the first embodiment, descriptions for designating various data for receiving, mapping, and forming a print job are also prepared.

FIG. 7 shows examples of the descriptions of various data.

L107 indicates designation of full-color printing of this job. L108 indicates designation of printing of the job in black. L109 and L110 indicate designation of printing of the job on an A3-size plain sheet and an A4-size transparent sheet, respectively. L111 indicates designation of double-sided printing. L112 indicates designation of printing of four copies of each page contained in the job. L113 indicates designation of the start of printing. This is the boundary between pages.

L107 to L113 described above are descriptions for designating various direct setup data for printing a print job. In addition to these descriptions, various indirect setup data can also be designated as PDL data. L114 indicates designation of selection of type 2 as a control method when the print job terminates abnormally. L115 indicates designation of selection of type 0 as a control method when the print job terminates normally. These control methods for abnormal termination and normal termination of a print job will be described in detail later.

L116 indicates a timeout value until a sheet is manually fed in a print job using manual feed sheets. In the first embodiment, 0 means that there is no timeout. L117 indicates a user name forming the print job. In the printer 1 of the first embodiment, this user name is displayed on the operation unit 14 as will be described later. L118 indicates the user ID of a user forming the print job. The user ID is used to uniquely identify each user and also used as a personalizing key for performing personalization as will be described later. L119 indicates designation of personalization. On the basis of this designation, personalization (to be described later) is performed.

In the first embodiment, personalization is performed when designated in PDL data. Personalization can also be performed unconditionally, when previously designated from the operation unit 14 or the like, or in accordance with setup data held in the personalizing server 3.

Messages displayed on the operation unit 14 of the printer 1 in the first embodiment will be described below with reference to FIGS. 8A to 8C.

Figure 8C:
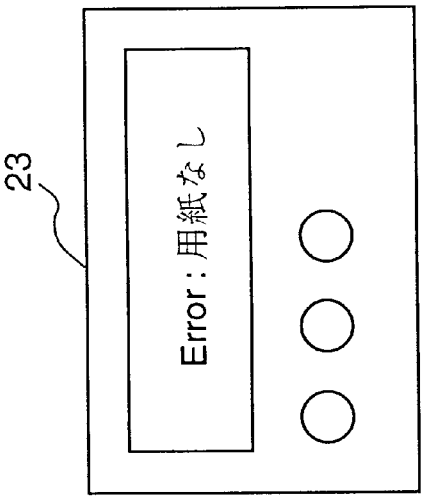
FIGS. 8A to 8C explain messages displayed on an operation unit of a printer according to the first embodiment of the present invention.
Figure 8B:
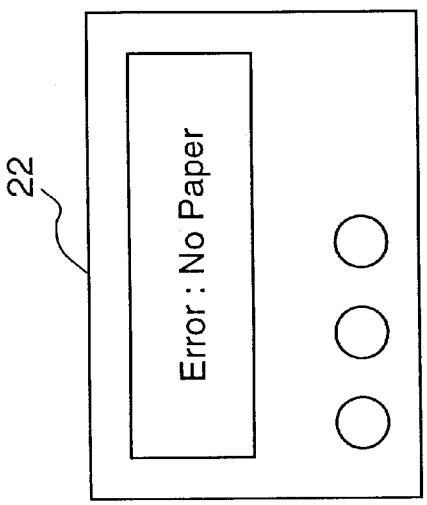
Figure 8A:
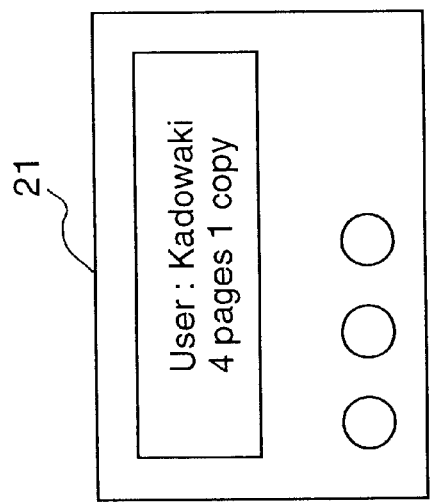

FIGS. 8A to 8C explain messages displayed on the operation unit of the printer according to the first embodiment of the present invention.

In FIG. 8A, reference numeral 21 denotes a message indicating that a print job of one copy of four pages is being executed under a user name "Kadowaki". As this user name, a user name described in the print job as indicated by L117 in FIG. 7 or a user name obtained by personalization (to be described later) is used. The number of pages is determined from the designated print number in the print job indicated by L113 in FIG. 7. The number of copies makes use of the designation of L112 in FIG. 7. In FIG. 8B, reference numeral 22 denotes an English message displayed when a no-paper error occurs. In FIG. 8C, reference numeral 23 denotes a Japanese message "用紙なし" (meaning no paper) displayed when a no-paper error occurs. Thus the printer 1 of the first embodiment can change the message language. Language to be used can be personalized as will be described later.

Reports printed out or sent by mail when a print job terminates normally or terminates abnormally will be described below with reference to FIGS. 9A to 9C.

FIGS. 9A to 9C are views for explaining reports printed out or sent by mail when a print job terminates normally or terminates abnormally in the first embodiment of the present invention.

When a print job terminates normally, three types of processes from type 0 to type 2 can be chosen. Type 0 is a process which performs nothing. Type 1 is a process which prints out a normal termination report 24 as shown in FIG. 9A. This normal termination report 24 describes the date, user name, number of pages, number of copies, and print costs. With this normal termination report 24, the user and numbers of pages and copies of the print job are indicated. The print cost is calculated by the CPU 8 by a predetermined calculation on the basis of functions used (color/black-and-white, single/sided/double-sided, and paper size) and the numbers of pages and copies. Type 2 is a process which sends the normal termination report 24 by mail through the network 2 to the computer which has transmitted the print job.

When a print job terminates abnormally, five types of processes from type 0 to type 4 can be chosen. Type 0 is a process which performs nothing. Type 1 is a process which prints out an abnormal termination report 25 as shown in FIG. 9B. Type 2 is a process which prints out an abnormal termination report 26 as shown in FIG. 9C. The abnormal termination report 25 is a detailed report describing the print document name, error name, and error cause in addition to the date, user name, number of pages, number of copies, and print costs. The report shown in FIG. 9B indicates that pages cannot be stapled because of too many pages. The abnormal termination report 26 is a simple report not containing the print document name, number of pages, and number of copies in order to reduce the amount of information to be seen by another user. The report shown in FIG. 9C indicates that no printing is performed because of manual feed timeout during manual feed printing.

Type 3 is a process which sends the abnormal termination report 25 shown in FIG. 9B by e-mail through the network 2 to the computer which has transmitted the print job. Type 4 is a process which sends the abnormal termination report 26 shown in FIG. 9C by e-mail through the network 2 to the computer which has transmitted the print job.

Conventional facsimile apparatuses and the like also have a function of printing abnormal termination reports. In the conventional apparatuses, however, data common to all users are set for such normal and abnormal termination reports. That is, each user cannot determine in accordance with his or her own taste, whether or not a normal and/or abnormal termination report is to be printed out. Also, each user cannot use his or her favorite report when printing out a report. In the printer of the first embodiment, data common to all users are set for normal and abnormal termination reports in the same manner as in the conventional apparatuses when no personalization is performed. When personalization is performed, however, each user can setup data for the normal and/or abnormal termination report. Since each user can thus use user's own normal and abnormal termination reports, the user can readily identify normal and abnormal termination reports for user's own print jobs.

Various setup data in the first embodiment will be described below with reference to FIGS. 10A to 10D.

FIGS. 10A to 10D explain various setup data according to the first embodiment of the present invention.

FIG. 10A shows the method where default data common to all users are held in the nonvolatile RAM 18.

In FIG. 10A, reference numeral 31-1 denotes a storage area for storing the upper-limit number of printed sheets common to all users; 31-2, a storage area for storing an available function list common to all users; 31-3, a storage area for storing normal termination report data common to all users; 31-4, a storage area for storing abnormal termination report data common to all users; 31-5, a storage area for storing user switch data common to all users; and 31-6, a storage area for storing a user name common to all users. For example, data "unknown user" is stored. Reference numeral 31-7 denotes a storage area for holding other registered data. Data in the nonvolatile RAM 18 is not lost even when the power supply of the printer 1 is turned off. Therefore, the contents of these default data also are not lost.

In the first embodiment, the data stored in the storage areas 31-1 to 31-6 are common to all users. Accordingly, when no personalization is performed such as immediately after the power supply is turned on, the common data stored in the storage areas 31-1 to 31-6 are copied to storage areas 32-1 to 32-6 (to be described later) and used as setup values for each user. The common data stored in the storage areas 31-1 to 31-6 can also be changed by using the operation unit 14. The common upper-limit number of printed sheets and the common available function list are protected by a password so that only the manager can change these data. However, the other setup data can be changed by general users.

FIG. 10B shows how various setup data are held in the work memory 10-2 of the volatile RAM 10.

In FIG. 10B, reference numeral 32-1 denotes a storage area for storing the upper-limit number of printed sheets of a user (to be referred to as a current user hereinafter) currently using the printer; 32-2, a storage area for storing an available function list of a current user; 32-3, a storage area for storing normal termination report data of a current user; 32-4, a storage area for storing abnormal termination report data of a current user; 32-5, a storage area for storing user switch data of a current user; 32-6, a storage area for storing the user name of a current user; and 32-7, a work area.

Since data in the volatile RAM 10 is lost when the power supply of the printer is turned off, default values are set in the individual storage areas when the power supply is turned on. More specifically, the data in the storage areas 31-1 to 31-6 of the nonvolatile RAM 18 are copied to the corresponding storage areas 32-1 to 32-6 of the work memory 10-2. The values in the storage areas 32-1 to 32-6 can be personalized by each user. When a certain storage area is personalized, the data in this storage area is rewritten by data for the corresponding user. When the process of one print job is complete and the process of a print job of another user is started, the data in this storage area is replaced with the corresponding default data in the nonvolatile RAM 18 and thereby initialized as when the power supply is turned on.

FIG. 10C shows practical examples of the components of the available function list.

Referring to FIG. 10C, the available function list contains color print function enable data 33-1, black-and-white print function enable data 33-2, transparency print function enable data 33-3, single-sided print function enable data 33-4, and the like. These setup data are used to limit functions made available to each individual user. For example, color printing is more expensive than black-and-white printing, so the setup data is used to permit only certain users to print in color. In contrast, black-and-white printing by a color printer is more expensive than black-and-white printing by a black-and-white printer. Therefore, the setup data is used to authorize only certain users to print black and white by a color printer.

FIG. 10D shows practical examples of the components of the user switch data.

Referring to FIG. 10D, the user switch data contains display language setup data 33-6, manual feed timeout value setup data 33-7, cover page setup data 33-8, and the like. The display language setup data 33-6 is used to designate the display language of the operation unit 14 as explained in FIG. 8. The cover page setup data 33-8 is used to determine whether a cover page identifying the user of a print job is added to the top of the print job when the job is printed. The format of the cover page is similar to the normal termination report 24 shown in FIG. 9A. However, while the normal termination report is printed at the end of a print job, the cover page is printed at the beginning of a print job. Also, the cover page does not describe the print costs.

Of the setup data shown in FIGS. 10A to 10D, the upper-limit number of printed sheets 32-1 defines the upper-limit number of sheets printable by one print job. The normal termination process data 32-3, the abnormal termination process data 32-4, the user name 32-6, and the manual feed timeout value 33-7 correspond to the designations by L115, L114, L117, and L116, respectively, shown in FIG. 7.

In the first embodiment, the normal termination process data 32-3, the abnormal termination process data 32-4, and the like of the various setup data shown in FIG. 10B can also be changed by designations in a print job. On the other hand, the upper-limit number of printed sheets 32-1 and the available function list 32-2 cannot be changed by designations in a print job. This is because data such as the available function list 32-2 is information to be managed by the manager, i.e., not to be changed by each user. The manager can easily manage by setting such management information only in the personalizing server 3.

Exchange of personalizing information in the first embodiment will be described below with reference to FIGS. 11A and 11B.

Figure 11B:
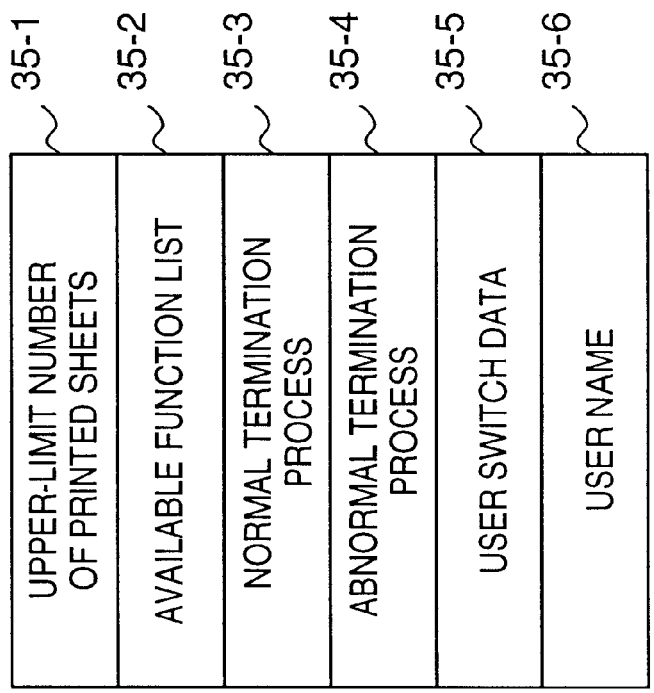
FIGS. 11A and 11B explain exchange of personalizing information according to the first embodiment of the present invention.
Figure 11A:
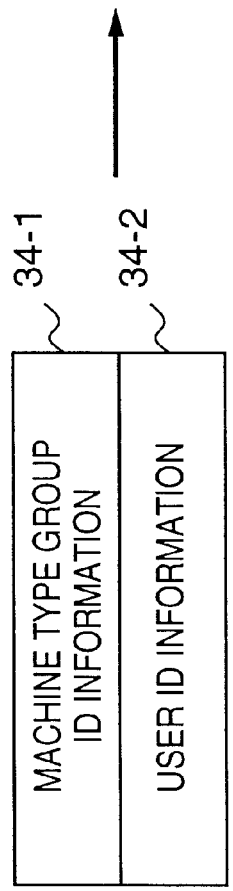

FIGS. 11A and 11B are views for explaining exchange of personalizing information according to the first embodiment of the present invention.

When a description designating personalization is found in a print job, as shown in FIG. 11A, the printer 1 sends machine type group ID information 34-1 and user ID information 34-2 to the personalizing server 3. The machine type group ID information 34-1 is used to identify the machine type group by a number, e.g., 1 for a copying machine, 2 for a facsimile apparatus, and 3 for a printer. The user ID information 34-2 is used to uniquely identify the current user currently using the printer. As this information, the information L118 shown in FIG. 7 is used.

Upon receiving the machine type group ID information 34-1 and the user ID information 34-2 of the current user from the printer 1, the personalizing server 3 extracts personalizing information stored for each machine type group and for each user. The personalizing server 3 sends personalizing information as shown in FIG. 11B to the printer 1. As shown in FIG. 11B, this personalizing information contains an upper-limit number of printed sheets 35-1 of the current user, an available function list 35-2 of the current user, setup data 35-3 relating to a normal termination report of the current user, setup data 35-4 relating to an abnormal termination report of the current user, user switch data 35-5 of the current user, and a user name 35-6 of the current user. The printer 1 accomplishes personalization by copying the supplied personalizing information in the storage areas 32-1 to 32-6 of the volatile RAM 18.

As described above, the personalizing server 3 manages personalizing information for each machine type group and exchanges personalizing information together with machine type group ID information. This allows a copying machine, a facsimile apparatus, and a printer to use use a common personalizing server. Also, personalizing information inherent to each machine type group can be acquired. Furthermore, personalizing information can be acquired by using only a user ID as a personalizing key without using machine type group ID information.

A process executed by the printer 1 of the first embodiment will be described below with reference to FIG. 12.

FIG. 12 is a flow chart showing the process executed by the printer according to the first embodiment of the present invention.

In step S11, the printer 1 receives a print job. In step S12, the printer 1 checks whether the print job contains a user ID description and a designation of personalization explained in FIG. 7. If a designation of personalization is found, the flow advances to step S13. In step S13, the printer 1 sends machine type group ID information and user ID information to the personalizing server 3 as explained in FIG. 11A. In step S14, the printer 1 receives personalizing information from the personalizing server 3 as explained in FIG. 11B. In step S15, the printer 1 personalizes various setup data by writing the received personalizing information in the storage areas 32-1 to 32-6 shown in FIG. 10B. In step S16, the printer 1 updates the information in the storage areas 32-1 to 32-6 shown in FIG. 10B on the basis of the various designations in the print job explained in FIG. 7.

In the first embodiment, the default values of the various setup data are personalized by the personalizing information. If a print job contains designations for the various setup data, these designations are preferentially used. It is also possible to always personalize the current values of the various setup data, i.e., always preferentially use the personalizing information. Furthermore, in accordance with the position of the personalization designation L119 shown in FIG. 7 and the position of designation for certain setup data, the later designation can be preferentially used.

On the other hand, if no designation of personalization is found in step S12, the flow advances to step S17, and the printer 1 writes the contents of the data 31-1 to 31-6 common to all users, stored in the nonvolatile RAM 18, into the storage areas 32-1 to 32-6 shown in FIG. 10B, thereby setting common data as the various setup data. Then, the printer 1 updates the information in the storage areas 32-1 to 32-6 shown in FIG. 10B on the basis of the various designations in the print job explained in FIG. 7.

In step S18, the printer 1 displays on the operation unit 14 the user name of the user, number of pages, number of copies, and the like of the print job currently being processed as explained in FIG. 8A. In step S19, the printer 1 checks, by using the available function list shown in FIG. 10B, whether or not the function designated by the print job is available. If the function is unavailable, the flow advances to step S23, and the printer 1 performs an abnormal termination process. Since this abnormal termination process is performed in accordance with the abnormal termination process setup data shown in FIG. 10B, each user can designate a personalized process. More specifically, each user can select any of the processes of performing nothing, printing out an abnormal termination report 25 or 26 as shown in FIG. 9B or 9C, or sending the abnormal termination report 25 or 26 by e-mail to the computer of the current user. In step S23, the printer 1 displays a message informing the user of an error on the operation unit 14 for a predetermined time. In this step, the printer 1 switches the English message as shown in FIG. 8B and the Japanese message as shown in FIG. 8C in accordance with the display language setup data shown in FIG. 10C.

On the other hand, if the function designated by the print job is available in step S19, the flow advances to step S20, and the printer 1 checks, by using the upper-limit number of printed sheets shown in FIG. 10B, whether or not the total number of printed sheets of the print job currently being processed exceeds the upper-limit number of printed sheets, If the total number of printed sheets exceeds the upper-limit number of printed sheets, the printer 1 performs an abnormal termination process in step S23.

If the total number of printed sheets of the print job currently being processed does not exceed the upper-limit number of printed sheets in step S20, the flow advances to step S21, and the printer 1 prints on the basis of the various data currently being set. If the cover page setup data 33-8 shown in FIG. 10C is YES, a cover page is also printed. In the case of manual feed printing, the manual feed timeout value 33-7 shown in FIG. 10C is used. In step S22, the printer 1 checks whether the printing terminates normally. If the printing terminates abnormally, the printer 1 performs an abnormal termination process in step S23. If printing terminates normally, the printer 1 performs a normal termination process in step S24.

Since this normal termination process is performed in accordance with the normal termination process setup data shown in FIG. 10B, each user can designate a personalized process. More specifically, each user can select any of the processes of performing nothing, printing out a normal termination report 24 as shown in FIG. 9A, or sending the normal termination report 24 by e-mail to the current user.

In the first embodiment, personalizing information is acquired each time a print job is processed. However, it is also possible not to re-acquire personalizing information if a print job is performed by the same user as the last print job. This method can be accomplished by leaving personalizing information of the user even after a print job is completed and, if the current user is the same as the last user, performing personalization on the basis of the left personalizing information in steps S13 to S15 of FIG. 12. It is also possible to cache not only personalizing information of a user of the last print job but also personalizing information of a plurality of users.

In the first embodiment, the format of normal and/or abnormal termination report can be personalized in the normal and/or abnormal termination process. Additionally, the language used in the normal and/or abnormal termination report can be personalized. Also, the normal and/or abnormal termination report can be selectively printed out or sent by e-mail in the first embodiment. The normal and/or abnormal termination report can also be displayed on the operation unit 14. Furthermore, the destination to be informed of the normal and/or abnormal termination report through the network can be personalized.

Second Embodiment

The second embodiment of the present invention is analogous to the first embodiment except for the arrangement of an image forming apparatus, the number of personalizing servers, a user ID acquiring means, an authenticating means, and personalizing items. In the second embodiment, therefore, the same reference numerals as in the first embodiment denote the same parts and a detailed description thereof will be omitted, and only the differences will be explained.

Figure 13:
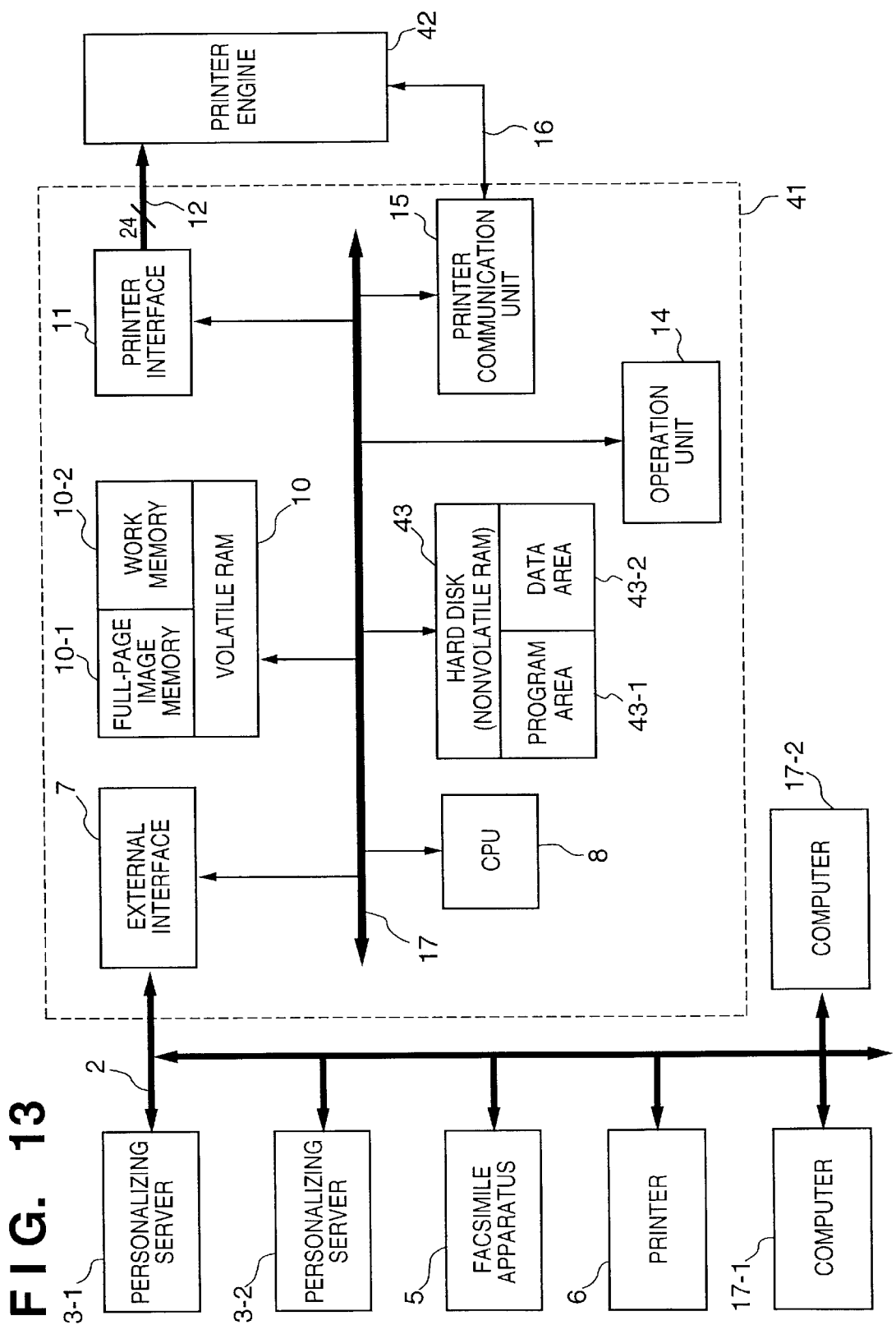
FIG. 13 is a block diagram showing the arrangement of an image forming system according to the second embodiment of the present invention.

FIG. 13 is a block diagram showing the arrangement of an image forming system according to the second embodiment of the present invention.

The first difference from the first embodiment is that an image forming apparatus comprises two apparatuses, i.e., a printer controller 41 and a printer engine 42. The printer engine 42 corresponds to the image forming unit 13 of the first embodiment, and the printer controller 41 corresponds to the other components of the printer 1 of the first embodiment. As in the first embodiment, the printer engine 42 is a full-color electrophotographic copying machine and can also be singly used as a color copying machine. The printer engine 42 can realize a print function with the addition of the printer controller 41.

The second difference from the first embodiment is the use of a plurality of personalizing servers. That is, a certain user acquires personalizing information from a personalizing server 3-1, and another user acquires personalizing information from a personalizing server 3-2. In the second embodiment, information indicating a personalizing server from which personalizing information is to be acquired is obtained as a part of user ID information described in a print job. For example, user ID information is broadcast to apparatuses on the network, and a personalizing server holding personalizing information corresponding to the user ID information sends the personalizing information in response to the user ID information.

The third difference from the first embodiment is that the nonvolatile RAM 18 is a hard disk 43. Since the cost per bit of the hard disk 43 is low although its minimum cost is high, the hard disk 43 is suited to holding a large amount of data. The hard disk 43 includes a data area 43-1 corresponding to the ROM 9 of the first embodiment and a data area 43-2 corresponding to the nonvolatile RAM 18 of the first embodiment. In the first embodiment, personalizing information is held in the volatile RAM 10. In the second embodiment, personalizing information is held in the data area 43-2 of the hard disk 43 because the cost per bit of the hard disk 43 is generally lower than that of a volatile RAM.

The fourth difference from the first embodiment is that in the first embodiment personalization is performed on the basis of the user ID information, described in a print job, of a user who has formed the print job, but in the second embodiment personalization is performed on the basis of the user ID information of a user who has transmitted a print job. That is, when a print job is to be received, user ID information is also received from the computer which has transmitted the print job. This is so because a user who has formed a print job is not necessarily the same as a user who prints the job. Accordingly, when different users print the same print job, each user can print in a personalized manner.

The fifth difference from the first embodiment is that user ID information contains a password. Especially in personalizing accounting information, it is necessary to prevent printing using user ID information of a third party. For this purpose, a password is received in addition to a user ID when a print job is received.

The sixth difference from the first embodiment is that font data and supplementary image data are personalized. Font data represents the shape of each character and is used to print character data in PDL data. Since a plurality of different types of fonts are present, the font to be used is generally designated in PDL data. However, a printer must also have font data of the designated font. If the printer does not have the designated font data or no font is designated, default font data is used.

Conventionally, a plurality of font data for printers are common to all users, and each printer holds these font data. In the second embodiment, each user has font data in a personalizing server and personalizes font data of a printer to be used by the user on the basis of the font data in the personalizing server. Supplementary image data is image data used in common when printing is done. In the second embodiment, supplementary image data contains form overlay image data, font data, and cover sheet image data (to be described later).

A form overlay function according to the second embodiment by which a fixed form image is overlaid on a general image and printed will be described below with reference to FIGS. 14A to 14C.

FIGS. 14A to 14C explain the form overlay function according to the second embodiment of the present invention.

FIG. 14A is an example of a form image to be overlaid on a general image shown in FIG. 14B. Consequently, a synthetic image as shown in FIG. 14C is printed. FIGS. 14A to 14C show how a calender character image 52 is synthesized on a background form image 51 and a calender image 53 is printed. The character image 52 shown in FIG. 14B is the calender of January. However, the calender of February can also be formed by replacing the character part with that of February. A frequently used image as described above is registered as a form image in a printer and synthesized on another image when printing is done. This obviates the need for supplying a form image from a computer each time printing is done. It is also possible to register and selectively use a plurality of different form images. Conventionally, these form images are common to all users and held in each printer. In the second embodiment, each user can have form images in a personalizing server and personalize form images in a printer to be used by the user on the basis of the form images in the personalizing server.

Cover sheet image data in the second embodiment will be described below.

Cover sheet image data in the second embodiment is image data for forming a cover page explained in the first embodiment. In the first embodiment, it is only possible to determine by personalization whether or not a cover page is to be printed. In the second embodiment, the image itself of a cover page can also be personalized. In the second embodiment, cover sheet image data is described as PDL data. However, cover sheet image data can also be described as raster image data. It is also possible to personalize image data for various reports, e.g., a normal termination report, an abnormal termination report, and a log report representing the operation record of an apparatus, as well as form overlay image data, font data, and cover sheet image data.

Various setup data in the second embodiment will be described below with reference to FIGS. 15A to 15D.

FIGS. 15A to 15D explain various setup data according to the second embodiment of the present invention.

FIG. 15A shows the way default data are held in the hard disk 43.

In FIG. 15A, reference numeral 61-1 denotes a storage area for storing the upper-limit number of printed sheets common to all users; 61-2, a storage area for storing an available function list common to all users; 61-3, a storage area for storing font data common to all users; 61-4, a storage area for storing cover sheet image data common to all users; 61-5, a storage area for storing form image data for form overlay common to all users; and 61-6, a storage area for storing other registered data. Data in the hard disk 43 are not lost even when the power supply of the printer is turned off. Hence, the contents of these default data also are not lost.

In the second embodiment, the data stored in the storage areas 61-1 to 61-5 are common to all users. Therefore, when no personalization is performed such as immediately after the power supply is turned on, the common data stored in the storage areas 61-1 to 61-5 are copied to storage areas 62-2 to 62-6 (to be described later) and used as setup values for each user. Also, the common data stored in the storage areas 61-1 to 61-5 can be changed by using an operation unit 14.

FIG. 15B shows the way various setup data for a current user are held in the hard disk 43.

In FIG. 15B, reference numeral 62-1 denote a storage area for storing the cumulative number of printed sheets of the current user; 62-2, a storage area for storing the upper-limit number of printed sheets of the current user; 62-3, a storage area for storing an available function list of the current user; 62-4, a storage area for storing font data of the current user; 62-5, a storage area for storing cover sheet image data of the current user; 62-6, a storage area for storing form image data of the current user; and 62-7, a work area.

When the power supply is turned on, default values are set in the individual areas shown in FIG. 15B. More specifically, the contents of the storage areas 61-1 to 61-5 shown in FIG. 15A are copied to the storage areas S 62-2 to 62-6 shown in FIG. 15B, and 0 is written in the storage area 62-1. Also, each user can personalize the value in each of the storage areas 62-1 to 62-6. When this personalization is performed, the data in the corresponding storage area is rewritten with data of this user. When the process of one print job is complete and the process of another user's print job is started, the data in this storage area is replaced with the corresponding default data and thereby initialized as when the power supply is turned on.

FIG. 15C shows examples of components of font data.

Referring to FIG. 15C, the font data include five different types of font data 63-1 to 63-5. When the first font is designated in PDL data, font data 1 (63-1) is used. When the second font is designated in PDL data, font data 2 (63-2) is used. The font data 63-1 is also used as default font data.

FIG. 15D shows examples of components of form image data.

Referring to FIG. 15D, the form image data include four different types of form image data 64-1 to 64-4. When form overlay on the first form image is designated in PDL data, form image 1 (64-1) is used. When form overlay on the second form image is designated in PDL data, form image 2 (64-2) is used.

In the first embodiment, whether or not the upper-limit number of printed sheets of a certain print job is exceeded is checked by checking whether or not the total number of printed sheets of the print job exceeds the upper-limit number of printed sheets of the job. In the second embodiment, as shown in FIG. 15B, the cumulative number of printed sheets is personalizable; i.e., this cumulative number of printed sheets 62-1 is compared with the upper-limit number of printed sheets 62-2 to check whether the upper-limit number of printed sheets is exceeded. As will be described later, this cumulative number of printed sheets is sent to and updated by a personalizing server after a print job is complete, so the results of different print jobs are added up. Analogously, the results of print jobs printed by different printers sharing the same personalizing information are added up as this cumulative number of printed sheets. Accordingly, a certain user can print until the sum total of the numbers of printed sheets of all print jobs printed by all printers sharing the same personalizing information exceeds the upper-limit number of printed sheets. If the sum total exceeds the upper-limit number, no more printing is possible.

Exchange of personalizing information in the second embodiment will be described below with reference to FIGS. 16A to 16C.

Figure 16A:
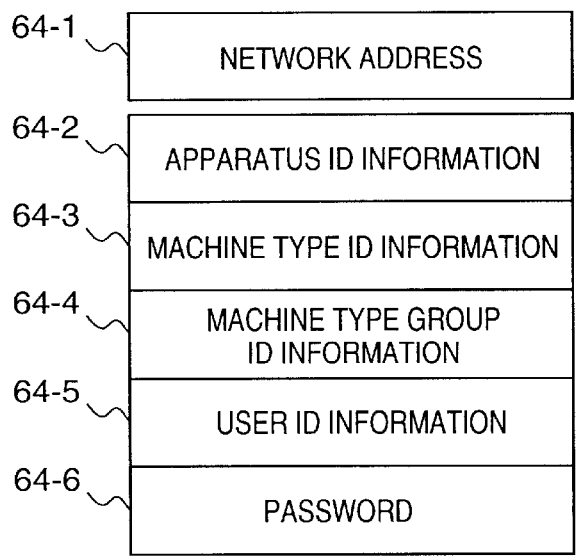
FIGS. 16A to 16C explain exchange of personalizing information according to the second embodiment of the present invention.
Figure 16B:
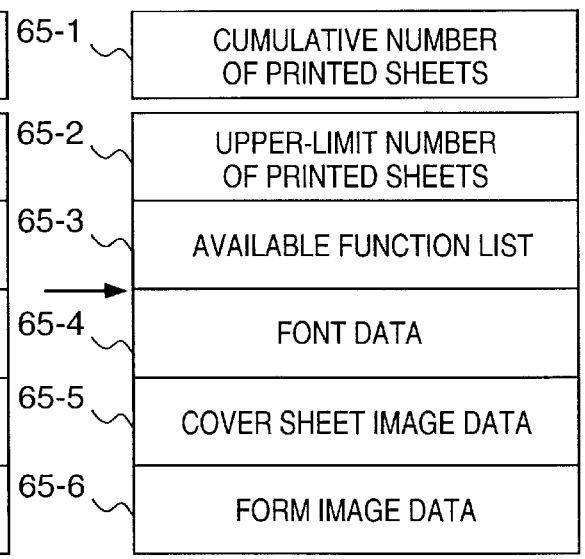
Figure 16C:
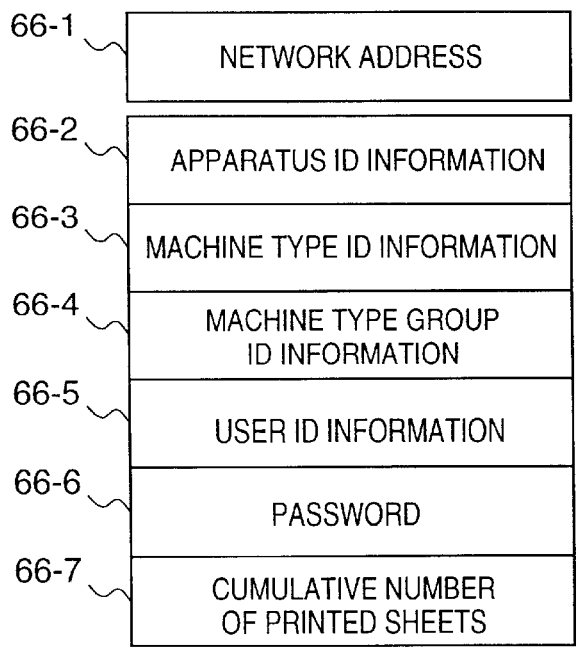

FIGS. 16A to 16C explain exchange of personalizing information according to the second embodiment of the present invention.

When a description designating personalization is found in a print job, as shown in FIG. 16A, the printer controller 41 sends apparatus ID information 64-2 of the printer controller 41, machine type ID information 64-3, machine type group ID information 64-4, user ID information 64-5, and a password 64-6 to the personalizing server 3-1 having a certain network address 64-1. The network address 64-1 of the personalizing server 3-1 is acquired as a part of user ID information described in the print job. The apparatus ID information 64-2 uniquely identifies the corresponding apparatus. More specifically, the network address of the printer controller 41 is used. The machine type ID information 64-3 identifies the machine type of printer by a number, e.g., 1 for a type X printer of a company A, 2 for a type Y printer of the company A, and 3 for a type Z printer of a company B. The machine type group ID information 64-4 identifies the machine type group by a number, e.g., 1 for a copying machine, 2 for a facsimile apparatus, and 3 for a printer. The user ID information 64-5 uniquely identifies the current user who has transmitted a print job currently being processed. The password 64-6 authenticates whether the user who has transmitted a print job is a user who is authorized to use the printer. This password 64-6 is acquired as a part of user ID information described in a print job.

Upon receiving the user ID information and the like from the printer controller 41, the personalizing server 3-1 first checks the user ID information and the password. If the personalizing server 3-1 authenticates that the user is an authorized user, the personalizing server 3-1 extracts personalizing information managed by itself and stored for an apparatus of that user. The personalizing server 3-1 sends this personalizing information, such as shown in FIG. 16B, to the printer controller 41. As shown in FIG. 16B, the personalizing information in the second embodiment contains a cumulative number of printed sheets 65-1 of the current user, an upper-limit number of printed sheets 65-2 of the current user, an available function list 65-3 of the current user, font data 65-4 of the current user, cover sheet image data 65-5 of the current user, and form image data 65-6 of the current user. The printer controller 41 accomplishes personalization by copying this personalizing information to the storage areas 62-1 to 62-6 shown in FIG. 15B.

When the print job is complete, as shown in FIG. 16C, the printer controller 41 sends apparatus ID information 66-2, machine type ID information 66-3, machine type group ID information 66-4, user ID information 66-5, a password 66-6, and a cumulative number of printed sheets 66-7 at that time to the personalizing server 3-1 having a network address 66-1. Upon receiving these pieces of information from the printer controller 41, the personalizing server 3-1 at the network address 66-1 rewrites and updates personalizing information stored for each individual apparatus in the personalizing server 3-1. Note that the network address 64-1 and the network address 66-1 are the same.

As described above, personalizing information is exchanged together with apparatus ID information and thereby managed for each individual apparatus. This makes a plurality of apparatuses unable to share the same personalizing information. However, this method has the advantage that each apparatus can perform personalization. For example, a common low-speed printer and a high-speed printer shared by a large number of users are used for different purposes, so frequently used functions and available functions of these printers are sometimes also different. In a case like this, it is more convenient if each apparatus is capable of personalization.

In the first embodiment, a personalizing server holds personalizing information for each machine type group, e.g., a copying machine group or a facsimile apparatus group. In the second embodiment, personalizing information is held for each individual apparatus. However, personalizing information can also be held for each machine type. This arrangement is intermediate between the first and second embodiments. More specifically, different kinds of personalizing information are held for a type A printer and a type B printer, but the same personalizing information is held for apparatuses A1 and A2 of the same type A. This arrangement has the advantage that apparatuses of the same machine type having a common apparatus configuration can share the same personalizing information and apparatuses of different machine types having different apparatus configurations can use different kinds of personalizing information.

As described above, a plurality of different kinds of ID information such as apparatus ID information, machine type ID information, machine group ID information, and user ID information are sent to a personalizing server. This allows the personalizing server to determine the type of personalizing information to be sent. That is, a personalizing server holding personalizing information different for individual users and common to all apparatuses can make a determination in accordance only with user ID information. A personalizing server holding personalizing information different for both of individual machine type groups and users can make a determination in accordance with machine type group ID information and user ID information. A personalizing server holding personalizing information for both of individual apparatuses and users can make a determination in accordance with apparatus ID information and user ID information.

A process executed by the printer controller 41 of the second embodiment will be described below with reference to FIG. 17.

Figure 17:
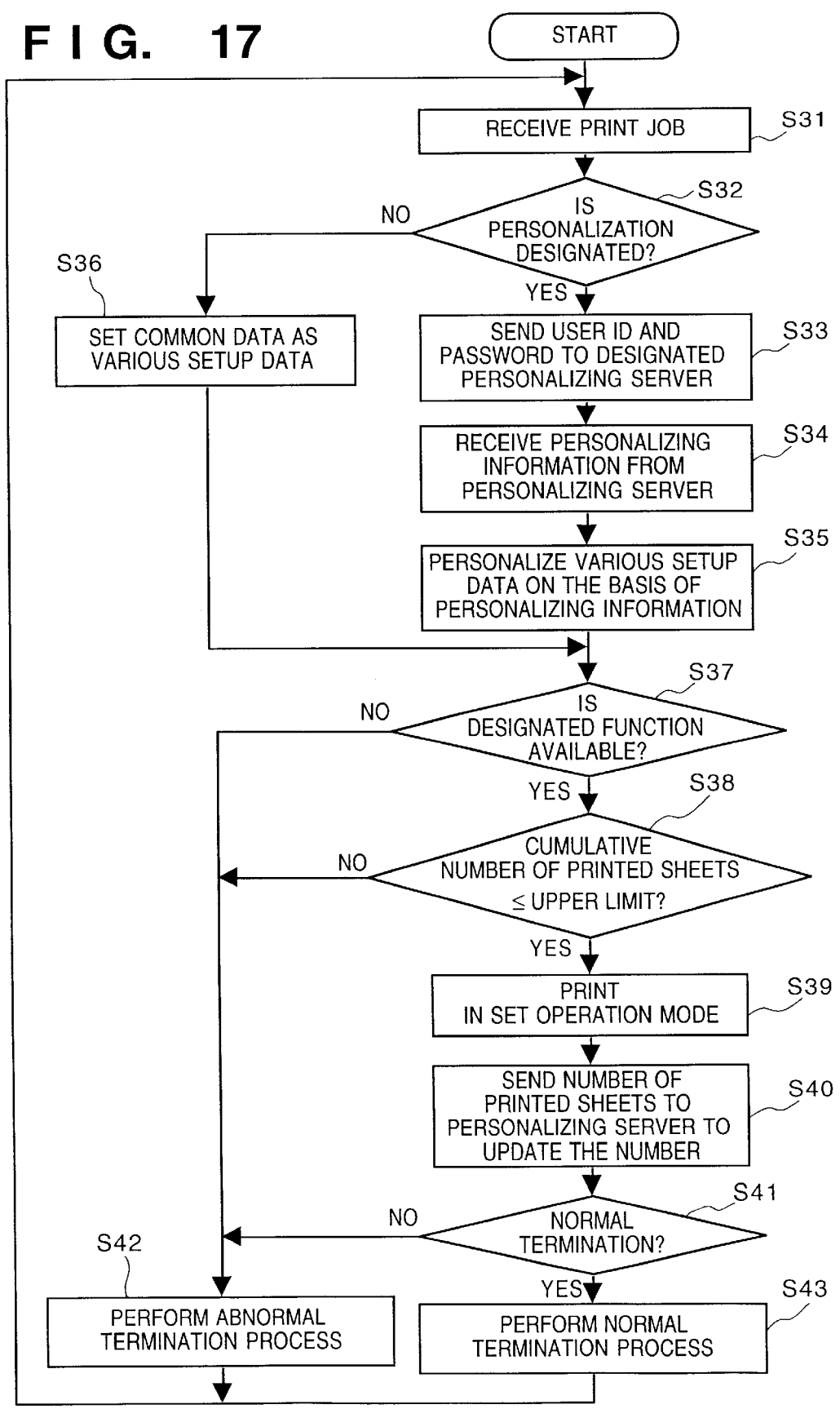
FIG. 17 is a flow chart showing a process executed by a printer controller according to the second embodiment of the present invention.

FIG. 17 is a flow chart showing the process executed by the printer controller 41 according to the second embodiment of the present invention.

In the second embodiment, differences from the flow chart shown in FIG. 12 of the first embodiment will be primarily described below.

In step S31, the printer controller 41 receives a print job. In step S32, the printer controller 41 checks whether or not the print job contains designation of personalization. If designation of personalization is found, the flow advances to step S33. In step S33, as explained in FIG. 16A, the printer controller 41 sends user ID information together with, e.g., apparatus ID information and a password to a personalizing server having a network address designated in the print job. In steps S34 and S35, the printer controller 41 receives personalizing information containing a cumulative number of printed sheets explained in FIG. 16B from the personalizing server and writes the information in the corresponding areas to perform personalization. If the password sent in step S33 is incorrect, the printer controller 41 does not receive any personalizing information and is informed of an error instead. If this is the case, the printer controller 41 performs an abnormal termination process in step S42. In the second embodiment, no process corresponding to step S16 of FIG. 12 is performed. That is, the items of personalization can be changed only by information from a personalizing server, i.e., cannot be changed in a print job.

On the other hand, if no designation of personalization is found in step S32, the flow advances to step S36, and the printer controller 41 copies the contents of the storage areas 61-1 to 61-6 shown in FIG. 15A to the storage areas 62-2 to 62-6 shown in FIG. 15B to set common data. In the second embodiment, restrictions are severely set, e.g., only black-and-white printing is permitted in these common setup data, so the use of the printer is restricted if no personalization is performed. The use of the printer can also be completely disabled if no personalization is performed. In step S37, the printer controller 41 checks whether or not a function designated in the print job matches one in the available function list. If the function does not match a function in the list, the printer controller 41 performs an abnormal termination process in step S42. If the function matches a function in the list, the flow advances to step S38.

In step S38, the printer controller 41 adds the total number of printed sheets of the print job to be printed to the cumulative number of printed sheets 62-1 shown in FIG. 15B. The printer controller 41 compares the total number of printed sheets with the upper-limit number of printed sheets 62-2 shown in FIG. 15B to check whether or not the total number of printed sheets exceeds the upper-limit number of printed sheets 62-2. If the upper limit is exceeded, the printer controller 41 performs an abnormal termination process in step S42. If the upper limit is not exceeded, the printer controller 41 prints in the set operation mode in step S39. If a font is designated, the printer controller 41 uses the designated font data in the font data 62-4 shown in FIG. 15B. If form overlay printing is designated, the printer controller 41 uses the designated form image in the form image data 62-6. If printing of a cover sheet is designated, the printer controller 41 prints the cover sheet by using the cover sheet image data 62-5.

In step S40, the printer controller 41 adds the number of actually printed sheets to the cumulative number of printed sheets 62-1. The printer controller 41 sends the cumulative number of printed sheets 62-1 to which the number of actually printed sheets is added to the personalizing server as explained in FIG. 16C, thereby updating the cumulative number of printed sheets in the personalizing server. In step S41, the printer controller 41 checks whether the printing terminates normally. If the printing terminates abnormally, the printer controller 41 performs an abnormal termination process in step S42. If the printing terminates normally, the printer controller performs a normal termination process in step S43.

Although a plurality of personalizing servers are dedicated servers in the second embodiment, a computer for transmitting a print job can also function as a server. Also, a personal computer of each user can function as a personalizing server of the user. If this is the case, each personalizing server holds only personalizing information of a single user. This eliminates the need to explicitly send user ID information to a personalizing server. This arrangement does not depart from the scope of the present invention because the identification information (e.g., the network address) itself of a personalizing server represents user ID information. The first and second embodiments have advantages that centralized management can be performed for personalizing information, a personalizing server always exists, and management information can also be personalized. On the other hand, the other embodiments have the advantages that no dedicated personalizing server need to be formed and each user can edit personalizing information by using the user's own personal computer.

In the image forming system of the second embodiment, an I/F for receiving a print job and an I/F for communicating with a personalizing server have the same arrangement. The present invention is similarly applicable to a printer which receives a print job from only one external apparatus via an I/F such as a SCSI-I/F. This arrangement requires a network I/F for communication with a personalizing server in addition to the SCSI-I/F for receiving a print job.

When personalization is designated in the second embodiment, personalization is performed by acquiring entire personalizing information from a personalizing server. Personalization can also be partially performed only when necessary. Partially exchanging personalizing information only when necessary can advantageously reduce the time of communication with a personalizing server. The data amount increases especially when image data such as a plurality of form image data are personalized as in the second embodiment. Therefore, the processing time can be effectively shortened if unnecessary personalization is not performed. More specifically, image data such as form image data is usually not exchanged as personalizing information. Only when form overlay printing is designated, only the designated form image data is received from a personalizing server.

In the second embodiment, each printer holds a copy of entire personalizing information in a personalizing server, so it does not take a long time to access the personalizing information. However, each printer can also hold only a part of a copy or no copy of personalizing information. In the former case, each printer acquires only the necessary part of personalizing information from a personalizing server when necessary. With this arrangement, a large amount of personalizing information can be handled. That is, a large amount of personalizing information needs to exist only in a personalizing server, so each printer can receive only a necessary part of personalizing data, when necessary, regardless of the memory capacity of the printer. For example, 100 types of font data are held in a personalizing server, and five types of these font data are copied to a printer. If this is the case, the printer need only have a storage area for the five types of font data. When new font data is necessary, font data least frequently used is erased, and the new font data is copied to the resulting empty area.

In the latter case, a printer does not have a copy of personalizing information in the memory of the printer. The printer acquires personalizing information from a personalizing server whenever the printer requires the information. For example, a file containing personalizing information in a personalizing server can be remotely mounted on a printer to allow the printer to access the file.

In the second embodiment, the cumulative number of printed sheets as a part of personalizing information is returned to a personalizing server. It is also possible to return only the increment to a personalizing server to allow the server to sum up the total. That is, only information necessary for update can be sent to a personalizing server to allow the server to update the information. This method is necessary to accurately count the cumulative number of printed sheets especially when a plurality of printers concurrently execute print jobs for the same user. In the second embodiment, update is performed after printing. However, update can also be performed immediately after personalization so that a personalizing server does not perform personalization for the current user of another printer until the update is complete. This method is necessary to accurately check the upper-limit number of printed sheets especially when a plurality of printers concurrently execute print jobs for the same user.

In the second embodiment, the cumulative number of printed sheets is personalized to check the upper limit as personalization of an available amount. However, the upper limit can also be checked by personalizing the cumulative cost of printing or the like.

Third Embodiment

The third embodiment of the present invention is similar to the first embodiment except for a means for receiving a print job, the arrangement of a personalizing key for acquiring personalizing information, and items of personalization. In the third embodiment, therefore, the same reference numerals as in the first embodiment denote the same parts and a detailed description thereof will be omitted, and only the differences will be explained.

Figure 18:
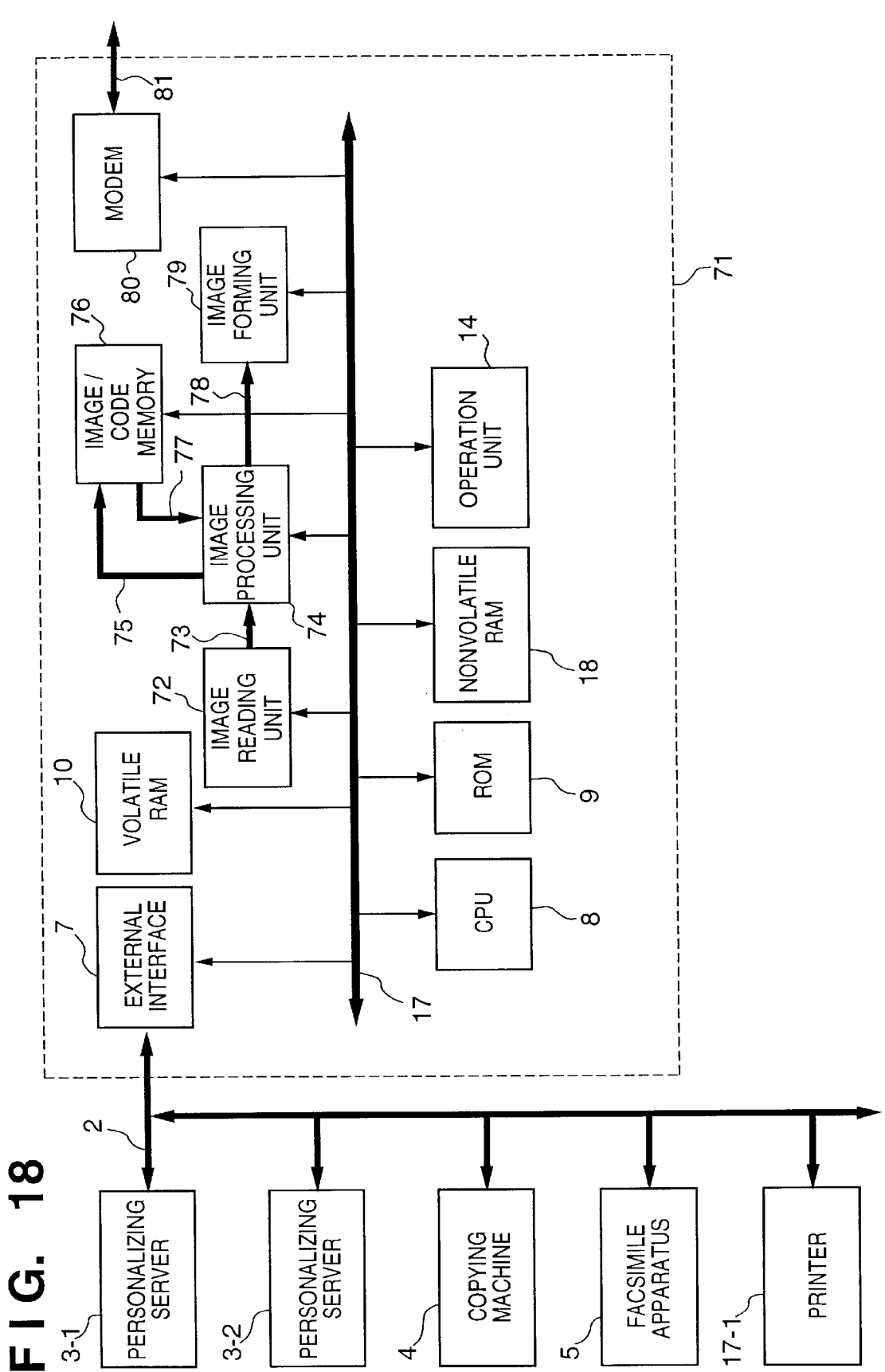
FIG. 18 is a block diagram showing the arrangement of an image forming system according to the third embodiment of the present invention.

FIG. 18 is a block diagram showing the arrangement of an image forming system according to the third embodiment of the present invention.

The first difference from the first embodiment is that an image forming apparatus is a facsimile apparatus, not a printer. The image forming apparatus of the first embodiment receives and prints a print job sent from an external apparatus connected through the network 2, and the printer and the external apparatus do not have a one-to-one correspondence with each other. The image forming apparatus of the third embodiment is a facsimile apparatus 71 which receives and prints a facsimile job sent from another facsimile apparatus connected in a one-to-one correspondence with the facsimile apparatus 71 through a public network.

The operation of the image forming apparatus of the third embodiment will be described below with reference to FIG. 18.

In the case of FAX reception, facsimile modulated data sent via a public network 81 is returned to code data by a modem 80. A CPU 8 writes the code data in an image/code memory 76. The CPU 8 then decodes the code data and again writes the decoded data as raster image data in the image/code memory 76. Raster image data 77 read out from the image/code memory 76 is transferred to an image processing unit 74 where image processing such as resolution conversion is performed. Processed raster image data 78 is transferred to an image forming unit 79 where image formation is performed.

An image reading unit 72 reads an original image and sends raster image data 73 to the image processing unit 74 where image processing such as resolution conversion is performed. Processed raster image data 75 is written in the image/code memory 76. Next, the CPU 8 encodes by using MR encoding or the like, the raster image data in the image/code memory 76 and again writes the encoded data as code data in the image/code memory 76. The CPU 8 then reads out the code data from the image/code memory 76 and sends the readout data in the modem 80. The modem 80 modulates the data and transmits the modulated data to another facsimile apparatus via the public network 81.

Various data for performing image reading, image processing during transmission, and transmission to another facsimile apparatus are set by a user by using an operation unit 14. Various data for performing reception from another facsimile apparatus, image processing during reception, and image formation are set by the user by using the operation unit 14, set in accordance with designations in received facsimile data, or set by personalization (to be described later).

The second difference from the first embodiment is the arrangement of a personalizing key for extracting personalizing information. As in the second embodiment, a plurality of personalizing servers exist as shown in FIG. 18. Personalizing information exists as a personalizing information file in each server. In the first and second embodiments, a personalizing key for extracting personalizing information is user ID information, a password as relevant information of the user ID information, or apparatus ID information. In the third embodiment, however, a personalizing key is the network address of a personalizing server paired with the file name of a file existing in the personalizing server and holding personalizing information.

A method of acquiring a FAX print job and a personalizing key will be described below with reference to FIG. 19.

FIG. 19 is a view for explaining the method of acquiring a FAX print job and a personalizing key according to the third embodiment of the present invention.

In the third embodiment as shown in FIG. 19, before common facsimile data 92 is transmitted, a personalizing key 91 is transmitted as header information from the transmitting side to the facsimile apparatus 71 at the receiving side. As described above, the personalizing key 91 is the network address of a personalizing server paired with the file name of a file existing in the personalizing server and holding personalizing information. On the basis of this personalizing key 91, the facsimile apparatus 71 accesses the personalizing server and extracts the personalizing information.

The third difference from the first embodiment is that personalization is performed by using information in the form of a script, instead of information in the form of a list. In the first embodiment, personalizing information containing various setup values is acquired from a personalizing server. On the basis of this personalizing information, the operations of the image forming apparatus are changed. That is, a plurality of control methods are prepared in the control program of the image forming apparatus, and one of these methods is selectively used in accordance with the contents of personalizing information. This system has the advantage that it is only necessary to transmit various setup values, i.e., a few pieces of information as personalizing information. In the third embodiment, on the other hand, a script describing a personalized control method is received from a personalizing server, and the control program performs control by interpreting and executing the script. This system allows personalization of the control method itself and advantageously increases the degree of freedom of personalization.

Exchange of personalizing information in the third embodiment will be described below with reference to FIGS. 20A and 20B.

FIGS. 20A and 20B are views for explaining exchange of personalizing information according to the third embodiment of the present invention.

When a description designating personalization is found in a received facsimile job, as shown in FIG. 20A, the facsimile apparatus 71 sends a personalizing file name 93-2 designated in the facsimile data to a personalizing server 3 having a network address 93-1 designated in the facsimile data. Upon receiving the personalizing file name 93-2 from the facsimile apparatus 71, the personalizing server 3 extracts personalizing information held in the personalizing file. As shown in FIG. 20B, the personalizing server 3 sends this personalizing information back to the facsimile apparatus 71. As shown in FIG. 20B, the personalizing information of the third embodiment contains a normal termination process script 94-1 of the current user and an abnormal termination process script 94-2 of the current user. The facsimile apparatus 71 realizes personalization by copying these scripts of the personalizing information to corresponding areas (not shown) of a volatile RAM 10.

The normal termination process script and the abnormal termination process script in the third embodiment will be described below with reference to FIGS. 21A to 21C.

FIGS. 21A to 21C are views for explaining the normal termination process script and the abnormal termination process script according to the third embodiment of the present invention.

FIG. 21A shows a first example of the normal termination process script.

L201 declares the start of the script. L202 is an instruction to mail a normal termination report to a user "kadowaki@xxx. canon. co. jp". L203 declares the end of the normal termination process script. Generally, a facsimile apparatus is used to transmit image data to a remote place and disconnected immediately after the transmission of the facsimile data is complete. Accordingly, it is conventionally difficult to check whether or not transmitted facsimile data is normally printed. When the facsimile apparatus of the third embodiment is used, on the other hand, whether or not transmitted data is normally printed can be checked by describing the mail address of the source as the destination described in L202.

FIG. 21B shows a second example of the normal termination process script.

L211 declares the start of the normal termination process script. L212 is an instruction to facsimile-transmit a normal termination report to a telephone number "03-999-9999". L203 declares the end of the normal termination process script. In the third embodiment, as shown in FIGS. 21A and 21B, each user can personalize the normal termination process in the form of a script.

FIG. 21C shows an example of the abnormal termination process script.

L221 declares the start of the abnormal termination process script. L222 is an instruction to check whether a serious error has occurred. L223 and L224 describe processes when a serious error occurs; L223 is an instruction to mail an abnormal termination report to a manager "admin@xxx. canon. co. jp", and L224 is an instruction to facsimile-transmit an abnormal termination report to a telephone number "03-999-9999". That is, L223 is the process of mailing an error report to the manager of the facsimile apparatus 71, and L224 is the process of facsimile-transmitting an error report to the transmitting side of the facsimile data. L225 is an instruction, when an unserious error has occurred, to wail until the error is corrected and restart printing after the error is corrected. L226 declares the end of the IF statement in L222. L227 declares the end of the abnormal termination process script. In the third embodiment as shown in FIG. 21C, each user can personalize the abnormal termination process in the form of a script. This script form allows flexible instructions as shown in FIG. 21C.

In the third embodiment, a personalized script is received from a personalizing server, and the control program of the facsimile apparatus performs control by interpreting and executing the script. However, it is also possible to receive a personalized control program itself from a personalizing server and perform control by executing the program. If this is the case, the received control program is stored in the volatile RAM 10 and executed by the CPU 8. This arrangement has the advantage that personalization can be performed with a higher degree of freedom than by using a script.

In the third embodiment, the facsimile apparatus 71 and a remote facsimile apparatus connected through the public network 81 cannot edit this script. However, the script can be edited if these apparatuses have appropriate input means and transfer means. It is also possible to use a method of editing the script on a personalizing server or a method of selectively using manufactured patterns prepared by the manufacturer.

A process executed by the facsimile apparatus 71 of the third embodiment will be described below with reference to FIG. 22.

Figure 22:
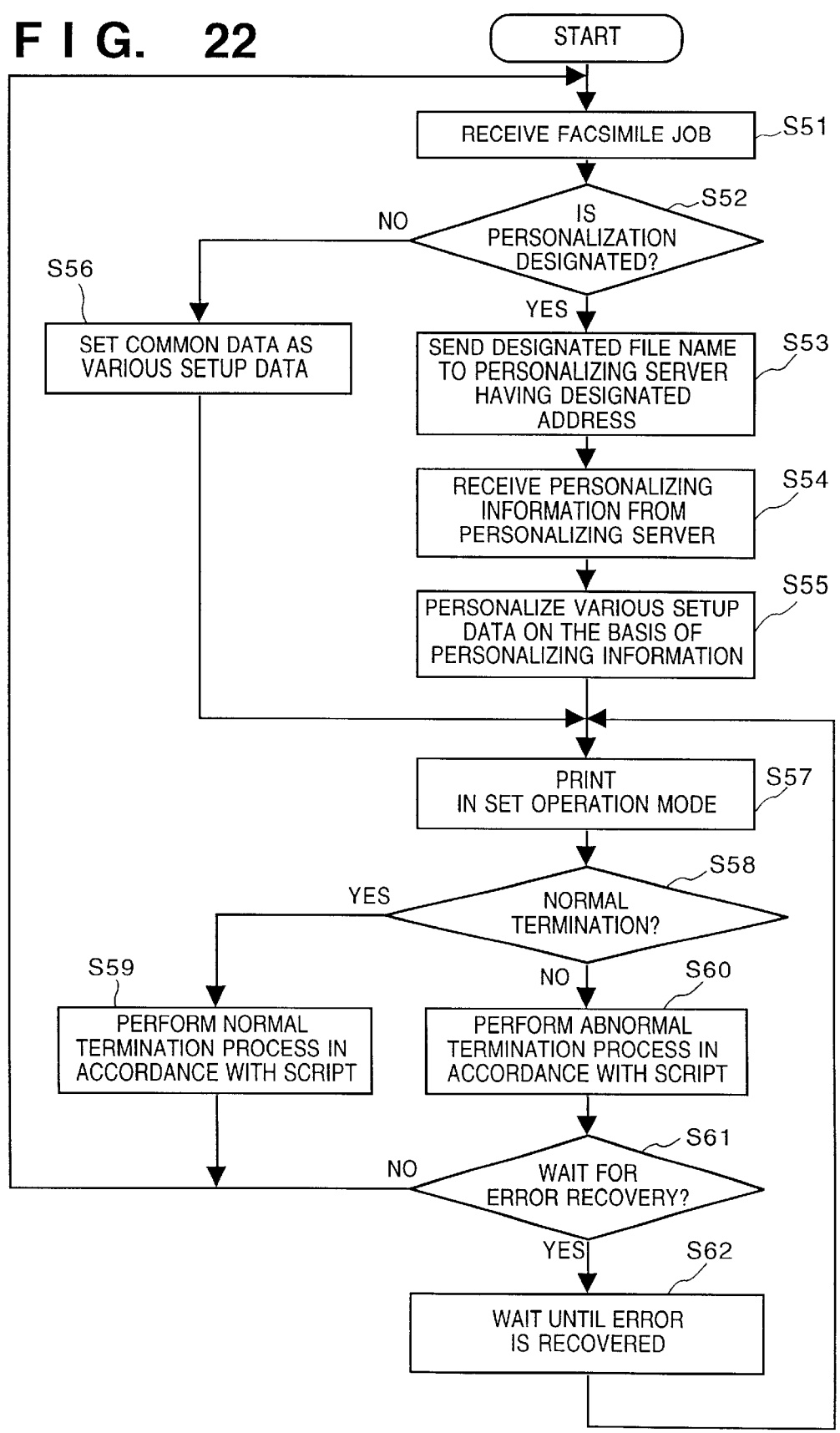
FIG. 22 is a flow chart showing a process executed by a facsimile apparatus according to the third embodiment of the present invention.

FIG. 22 is a flow chart showing the process executed by the facsimile apparatus 71 according to the third embodiment of the present invention.

Differences from the flow chart in FIG. 12 of the first embodiment will be explained below.

In step S51, the facsimile apparatus 71 receives a facsimile job. In step S52, the facsimile apparatus 71 checks whether personalization is designated. If personalization is designated, the flow advances to step S53. In step S53, as explained in FIG. 20A, the facsimile apparatus 71 sends a personalizing file name designated in the facsimile data to a personalizing server having a network address designated in the facsimile data. In steps S54 and S55, the facsimile apparatus 71 receives personalizing information containing the personalized scripts explained in FIG. 22B from the personalizing server and writes the scripts in storage areas (not shown) of the volatile RAM 10 to perform personalization.

If no personalization is designated in step S52, the flow advances to step S56, and the facsimile apparatus 71 copies default scripts to the storage areas (not shown) of the volatile RAM 10 to set common data. In step S57, the facsimile apparatus 71 prints in the set operation mode. In step S58, the facsimile apparatus 71 checks whether or not the printing terminates normally. If the printing terminates normally, the flow advances to step S59, and the facsimile apparatus 71 performs a process in accordance with the normal termination process script as explained in FIG. 21A or 21B.

On the other hand, if the printing terminates abnormally, the flow advances to step S60, and the facsimile apparatus 71 performs a process in accordance with the abnormal termination process script as explained in FIG. 21C. In step S61, the facsimile apparatus 71 checks whether or not the abnormal termination process script contains an instruction to wait until the error is corrected. If the instruction to wait until the error is corrected is contained, the flow advances to step S62, and the facsimile apparatus 71 waits until the error is corrected. After that, the flow returns to step S57, and the facsimile apparatus 71 continues to print. If no instruction to wait until the error is corrected is contained, the flow advances to step S51.

In the third embodiment, the network address of a personalizing server paired with the file name of a file existing in the personalizing server and holding personalizing information is used as a personalizing key. However, a URL (Uniform Resource Locator) formed by integrating the network address and file name can also be used as a personalizing key. It is also possible to use one of the network address of a personalizing server and the file name of a file existing in the personalizing server and holding personalizing information as a personalizing key.

In the third embodiment, a facsimile job is transmitted from another facsimile apparatus connected in a one-to-one correspondence with the facsimile apparatus 71 through the public network 81. The present invention is also applicable to a facsimile apparatus capable of receiving facsimile data from another facsimile apparatus 5 connected, not in a one-to-one correspondence with the facsimile apparatus of the present invention, through the network 2. If this is the case, facsimile data encoded by MR or the like flow on the network 2, i.e., so-called LAN facsimile is realized.

Other Embodiments

In the first to third embodiments described above, the present invention is applied to a color printer and a black-and-white facsimile apparatus. However, the present invention is similarly applicable to a black-and-white printer and a color facsimile apparatus. The present invention has greater effects on color apparatuses because the number of functions is large in color apparatuses, so the number of setup items personalizable by users is also large.

In the first to third embodiments, an image memory holds raster image data. However, it is also possible to hold compressed raster image data and print the data while mapping it.

In the first to third embodiments, the user ID information, described in a print job, of a user who has formed the print job or the user ID information of a user who has transmitted a print job is acquired. However, any other information can also be used as long as the information can uniquely identify the user. For example, the identification information or the network address of a computer which has transmitted a print job can be used in place of the user ID information.

In the first to third embodiments, a common image forming apparatus which forms an image on a paper-like recording medium on the basis of a print job received from an external apparatus is personalized. However, the present invention can be applied to any image forming apparatus having a personalizable mode. For example, the present invention is applicable to a film recorder for receiving a print job and forming an image on a photographic film.

In the first to third embodiments, apparatuses are connected by using a bus type network. However, another type of network can also be used provided that the network can connect a plurality of apparatuses. Also, wireless connection can be used instead of wired connection.

In the first to third embodiments, one or more dedicated servers are used as one or more personalizing servers. However, one printer or facsimile apparatus can also function as a personalizing server.

In the first to third embodiments of the present invention as described above, various setup data of image forming apparatuses are collectively held for individual users in an external personalizing server of the image forming apparatuses. When a certain user is to use a given image forming apparatus, the apparatus receives various setup data for the user from the personalizing server to personalize the setup data in the apparatus. This can significantly improve the operability for that user.

More specifically, specific data of each individual user can be set as data which can be designated in each printer. Also, the same values can be set in different image forming apparatuses. Furthermore, it is possible to store a larger amount of setup data and image data which are difficult to store in conventional apparatuses.

The present invention can be applied to a system constituted by a plurality of devices (e.g., host computer, interface, reader, printer) or to an apparatus (e.g., copying machine, facsimile) comprising a single device.

Furthermore, the object of the present invention can also be achieved by providing a storage medium storing program codes for performing the aforesaid functions according to the embodiments to a system or an apparatus, reading the program codes with a computer (e.g., CPU, MPU) of the system or apparatus from the storage medium, and then executing the program.

In this case, the program codes read from the storage medium realize the functions according to the embodiments, and the storage medium storing the program codes constitutes the invention.

Furthermore, the storage medium, such as a floppy disk, a hard disk, an optical disk, a magneto-optical disk, a CD-ROM, a CD-R, a magnetic tape, a non-volatile type memory card, and a ROM can be used for providing the program codes.

Furthermore, besides aforesaid functions according to the above embodiments are realized by executing the program codes which are read by a computer, the present invention includes a case where an OS (Operating System) or the like running on the computer performs a part or entire processes in accordance with designations of the program codes and realizes functions according to the above embodiments.

Furthermore, the present invention also includes a case where, after the program codes read from the storage medium are written in a function extension board which is inserted into the computer or in a memory provided in a function extension unit which is connected to the computer, CPU or the like contained in the function extension board or unit performs a part or entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. An image forming system having a server, an external apparatus, and an image forming apparatus are connected via a network, comprising:

generating means, provided in said external apparatus, for generating image forming information containing a key for designating acquisition of setup information for image formation;

transmitting means for transmitting the image forming information generated by said generating means to said image forming apparatus;

managing means, provided in said server, for managing setup information for image formation by said image forming apparatus;

receiving means, provided in said image forming apparatus, for receiving the image forming information;

acquiring means for acquiring setup information managed in said server and corresponding to the key contained in the image forming information received by said receiving means; and forming means for forming an image corresponding to the image forming information on the basis of the setup information acquired by said acquiring means.

2. The apparatus according to claim 1, wherein said image forming apparatus is at least a printer or a facsimile apparatus.

3. An image forming apparatus connected to a server and an external apparatus via a network, comprising:

receiving means for receiving, from said external apparatus, image forming information containing a key for designating acquisition of setup information for image formation;

acquiring means for acquiring, from said server, setup information corresponding to the key contained in the image forming information received by said receiving means; and forming means for forming an image corresponding to the image forming information on the basis of the setup information acquired by said acquiring means.

4. The apparatus according to claim 3, wherein the key is a user ID for identifying the image forming information, and said acquiring means transmits the user ID to said server and acquires setup information corresponding to the user ID.

5. The apparatus according to claim 4, wherein the user ID indicates a user who has formed the image forming information.

6. The apparatus according to claim 4, wherein the user ID indicates an external apparatus which has formed the image forming information.

7. The apparatus according to claim 4, wherein the user ID contains password information.

8. The apparatus according to claim 3, wherein the key contains access information for accessing a server to be accessed, and said acquiring means accesses a server indicated by the access information and acquires setup information corresponding to the access information.

9. The apparatus according to claim 8, wherein the access information is a network address of said server.

10. The apparatus according to claim 9, wherein the access information contains a name of a file containing setup information in addition to the network address of said server.

11. The apparatus according to claim 3, wherein said acquiring means updates a current value of the setup information.

12. The apparatus according to claim 3, wherein said acquiring means updates a default value of the setup information.

13. The apparatus according to claim 3, wherein said server comprises font holding means for holding font data, and the setup information contains setup data for the font data.

14. The apparatus according to claim 3, wherein said server comprises supplementary image holding means for holding a supplementary image formable by said forming means, and the setup information contains setup data for the supplementary image.

15. The apparatus according to claim 3, wherein the setup information contains setup data for a process when the image formation based on the image forming information terminates normally.

16. The apparatus according to claim 3, wherein the setup information contains setup data for a process when an error occurs.

17. The apparatus according to claim 3, further comprising display means for displaying information relating to the image formation based on the image forming information, wherein the setup information contains setup data for contents displayed by said display means.

18. The apparatus according to claim 3, wherein the setup information contains setup data for restrictions in the image formation based on the image forming information.

19. The apparatus according to claim 18, wherein the restrictions contain setup data for available functions.

20. The apparatus according to claim 18, wherein the restrictions contain setup data for available amounts for printing.

21. The apparatus according to claim 3, wherein the setup information contains types and contents of various setup data in the form of a list.

22. The apparatus according to claim 3, wherein the setup information is formed by a script.

23. The apparatus according to claim 3, wherein the setup information is formed by a program.

24. The apparatus according to claim 3, wherein the key contains machine type group ID information indicating a machine type group of said external apparatus, and said acquiring means acquires setup information corresponding to the machine type group ID information from said server.

25. The apparatus according to claim 3, wherein the key contains machine type ID information indicating a machine type of said external apparatus, and said acquiring means acquires setup information corresponding to the machine type ID information from said server.

26. The apparatus according to claim 3, wherein the key contains apparatus ID information for identifying each of a plurality of external apparatuses, and said acquiring means acquires setup information corresponding to the apparatus ID information from said server.

27. The apparatus according to claim 3, wherein said acquiring means acquires setup information from one of a plurality of servers on the basis of the key.

28. The apparatus according to claim 3, wherein the setup information contains a plurality of elements, and said acquiring means acquires a part of the setup information when necessary.

29. The apparatus according to claim 3, wherein said receiving means receives the image forming information from an external apparatus connected in a one-to-one correspondence with said receiving means through a public network on the basis of a communication function defined by CCITT recommendation.

30. The apparatus according to claim 3, wherein the key contains an instruction to update setup information managed by said server.

31. A method of controlling an image forming apparatus connected to a server and an external apparatus via a network, comprising:

the reception step of receiving, from said external apparatus, image forming information containing a key for designating acquisition of setup information for image formation;

the acquisition step of acquiring, from said server, setup information corresponding to the key contained in the image forming information received in the reception step; and the formation step of forming an image corresponding to the image forming information on the basis of the setup information acquired in the acquisition step.

32. A computer readable memory storing program codes for controlling an image forming apparatus connected to a server and an external apparatus via a network, comprising:

a program code of the reception step of receiving, from said external apparatus, image forming information containing a key for designating acquisition of setup information for image formation;

a program code of the acquisition step of acquiring, from said server, setup information corresponding to the key contained in the image forming information received in the reception step; and a program code of the formation step of forming an image corresponding to the image forming information on the basis of the setup information acquired in the acquisition step.

33. An image forming system in which a server and an image forming apparatus are connected via a network, comprising:

generating means, provided in said image forming apparatus, for generating image forming information containing a key for designating acquisition of setup information for image formation;

transmitting means for transmitting the image forming information generated by said generating means to said server;

managing means, provided in said server, for managing setup information for image formation by said image forming apparatus;

receiving means for receiving the image forming information transmitted from said image forming apparatus;

acquiring means for acquiring setup information managed by said managing means and corresponding to the key contained in the image forming information received by said receiving means; and forming means for forming an image corresponding to the image forming information on the basis of the setup information acquired by said acquiring means.

34. The apparatus according to claim 33, wherein said image forming apparatus is at least a printer or a facsimile apparatus.

35. An image forming apparatus connected to a server via a network, comprising:
generating means for generating image forming information containing a key for designating acquisition of setup information for image formation;
acquiring means for acquiring, from said server, setup information corresponding to the key contained in the image forming information generated by said generating means; and
forming means for forming an image corresponding to the image forming information on the basis of the setup information acquired by said acquiring means.

36. The apparatus according to claim 35, wherein
the key is a user ID for identifying the image forming information, and
said acquiring means transmits the user ID to said server and acquires setup information corresponding to the user ID.

37. The apparatus according to claim 36, wherein the user ID indicates a user who has formed the image forming information.

38. The apparatus according to claim 36, wherein the user ID indicates an external apparatus which has formed the image forming information.

39. The apparatus according to claim 36, wherein the user ID contains password information.

40. The apparatus according to claim 35, wherein
the key contains access information for accessing a server to be accessed, and
said acquiring means accesses a server indicated by the access information and acquires setup information corresponding to the access information.

41. The apparatus according to claim 40, wherein the access information is a network address of said server.

42. The apparatus according to claim 41, wherein the access information contains a name of a file containing setup information in addition to the network address of said server.

43. The apparatus according to claim 35, wherein said acquiring means updates a current value of the setup information.

44. The apparatus according to claim 35, wherein said acquiring means updates a default value of the setup information.

45. The apparatus according to claim 35, wherein
said server comprises font holding means for holding font data, and
the setup information contains setup data for the font data.

46. The apparatus according to claim 35, wherein
said server comprises supplementary image holding means for holding a supplementary image formable by said forming means, and
the setup information contains setup data for the supplementary image.

47. The apparatus according to claim 35, wherein the setup information contains setup data for a process when the image formation based on the image forming information terminates normally.

48. The apparatus according to claim 35, wherein the setup information contains setup data for a process when an error occurs.

49. The apparatus according to claim 35, further comprising display means for displaying information relating to the image formation based on the image forming information,
wherein the setup information contains setup data for contents displayed by said display means.

50. The apparatus according to claim 35, wherein the setup information contains setup data for restrictions in the image formation based on the image forming information.

51. The apparatus according to claim 50, wherein the restrictions contain setup data for available functions.

52. The apparatus according to claim 50, wherein the restrictions contain setup data for available amounts.

53. The apparatus according to claim 35, wherein the setup information contains types and contents of various setup data in the form of a list.

54. The apparatus according to claim 35, wherein the setup information is formed by a script.

55. The apparatus according to claim 35, wherein the setup information is formed by a program.

56. A method of controlling an image forming apparatus connected to a server via a network, comprising:
the generation step of generating image forming information containing a key for designating acquisition of setup information for image formation;
the acquisition step of acquiring, from said server, setup information corresponding to the key contained in the image forming information generated in the generation step; and
the formation step of forming an image corresponding to the image forming information on the basis of the setup information acquired in the acquisition step.

57. A computer readable memory storing program codes for controlling an image forming apparatus connected to a server via a network, comprising:
a program code of the generation step of generating image forming information containing a key for designating acquisition of setup information for image formation;
a program code of the acquisition step of acquiring, from said server, setup information corresponding to the key contained in the image forming information generated in the generation step; and
a program code of the formation step of forming an image corresponding to the image forming information on the basis of the setup information acquired in the acquisition step.

* * * * *

UNITED STATES PATENT AND TRADEMARK OFFICE
CERTIFICATE OF CORRECTION

PATENT NO. : 6,313,921 B1
DATED : November 6, 2001
INVENTOR(S) : Toshihiro Kadowaki It is certified that error appears in the above-identified patent and that said Letters Patent is hereby corrected as shown below:

Column 7,
Line 58, "acquire" should read -- acquires --.

Column 8,
Line 1, "acquired acquired" should read -- acquired --;
Line 35, "layed" should read -- laid --;
Line 39, "string" should read -- string1 --; and
Line 52, "the" (second occurrence) should read -- to the --.

Column 13,
Line 29, "use use" should read -- use --.

Column 17,
Line 39, "denote" should read -- denotes --.

Column 25,
Line 13, "wail" should read -- wait --.

Signed and Sealed this

Nineteenth Day of March, 2002

Attest:

*Attesting Officer*

JAMES E. ROGAN
*Director of the United States Patent and Trademark Office*